United States Patent
Sakuragi et al.

(10) Patent No.: US 10,919,994 B2
(45) Date of Patent: Feb. 16, 2021

(54) METALLOCENE COMPOUND, CATALYST COMPONENT FOR OLEFIN POLYMERIZATION AND CATALYST FOR OLEFIN POLYMERIZATION CONTAINING THE SAME, AND METHOD FOR PRODUCING OLEFIN POLYMER USING CATALYST FOR OLEFIN POLYMERIZATION

(71) Applicant: JAPAN POLYETHYLENE CORPORATION, Tokyo (JP)

(72) Inventors: Tsutomu Sakuragi, Mie (JP); Yoshiyuki Ishihama, Mie (JP)

(73) Assignee: JAPAN POLYETHYLENE CORPORATION, Tokyo (JP)

( * ) Notice: Subject to any disclaimer, the term of this patent is extended or adjusted under 35 U.S.C. 154(b) by 84 days.

(21) Appl. No.: 16/081,311

(22) PCT Filed: Mar. 3, 2017

(86) PCT No.: PCT/JP2017/008621
§ 371 (c)(1),
(2) Date: Aug. 30, 2018

(87) PCT Pub. No.: WO2017/150731
PCT Pub. Date: Sep. 8, 2017

(65) Prior Publication Data
US 2019/0010265 A1 Jan. 10, 2019

(30) Foreign Application Priority Data

Mar. 4, 2016 (JP) ................ JP2016-042853

(51) Int. Cl.
| | | |
|---|---|---|
| C08F 4/6592 | (2006.01) | |
| C08F 210/16 | (2006.01) | |
| C08F 210/08 | (2006.01) | |
| C08F 10/00 | (2006.01) | |
| C07F 19/00 | (2006.01) | |
| C07F 7/08 | (2006.01) | |
| C07F 17/00 | (2006.01) | |
| C07F 7/00 | (2006.01) | |

(52) U.S. Cl.
CPC .............. *C08F 210/08* (2013.01); *C07F 7/08* (2013.01); *C07F 7/0812* (2013.01); *C07F 17/00* (2013.01); *C07F 19/00* (2013.01); *C08F 4/6592* (2013.01); *C08F 4/65927* (2013.01); *C08F 10/00* (2013.01); *C08F 210/16* (2013.01); *C07F 7/00* (2013.01)

(58) Field of Classification Search
CPC ..... C08F 17/00; C08F 4/65927; C08F 210/16
See application file for complete search history.

(56) References Cited

U.S. PATENT DOCUMENTS

| | | | |
|---|---|---|---|
| 6,444,833 B1 | 9/2002 | Ewen et al. | |
| 6,635,779 B1 | 10/2003 | Ewen et al. | |
| 2003/0036612 A1 | 2/2003 | Nifant'ev et al. | |
| 2004/0254315 A1* | 12/2004 | Resconi ................ | C08F 10/08 526/127 |
| 2005/0234204 A1* | 10/2005 | Resconi ................ | C08F 10/00 526/127 |
| 2006/0160967 A1 | 7/2006 | Voskoboynikov et al. | |
| 2006/0160968 A1 | 7/2006 | Voskoboynikov et al. | |
| 2006/0183874 A1 | 8/2006 | Voskoboynikov et al. | |
| 2010/0113717 A1 | 5/2010 | Voskoboynikov et al. | |

FOREIGN PATENT DOCUMENTS

| | | |
|---|---|---|
| CN | 1347424 | 5/2002 |
| JP | H05-43619 A | 2/1993 |
| JP | H07-500622 A | 1/1995 |
| JP | H08-48711 A | 2/1996 |
| JP | 2008-50278 A | 3/2008 |
| JP | 2011-137146 A | 7/2011 |

(Continued)

OTHER PUBLICATIONS

International Search Report issued with respect to Patent Application No. PCT/JP2017/008621, dated Apr. 4, 2017.

(Continued)

*Primary Examiner* — Caixia Lu
(74) *Attorney, Agent, or Firm* — Greenblum & Bernstein, P.L.C.

(57) ABSTRACT

The metallocene compound represented by the following general formula (1):

(the numerals and signs in the general formula (1) are as described in the description).

14 Claims, 1 Drawing Sheet

(56) References Cited

FOREIGN PATENT DOCUMENTS

| WO | 93/08221 A2 | 4/1993 |
|----|-------------|--------|
| WO | 01/44318 A1 | 6/2001 |
| WO | 01/47939 A1 | 7/2001 |
| WO | 2006/065844 A2 | 6/2006 |

OTHER PUBLICATIONS

International Preliminary Report on Patentability issued with respect to Patent Application No. PCT/JP2017/008621, dated Sep. 4, 2018.
Office Action, European Patent Office, Application No. 17 760 193.7, dated Jul. 17, 2019, 3 pages.
Extended European Search Report in corresponding European Patent Application No. 17760193.7 dated Jan. 21, 2019.
Chinese Office Action issued with respect to Chinese Application No. 201780015273.5, dated Mar. 31, 2020, with English translation.
Office Action issued in Japan Counterpart Patent Appl. No. 2017-041011, dated May 22, 2020, along with an English translation thereof.
Chinese Office Action issued with respect to Chinese Application No. 201780015273.5, dated Oct. 16, 2020, with English translation.

* cited by examiner

METALLOCENE COMPOUND, CATALYST COMPONENT FOR OLEFIN POLYMERIZATION AND CATALYST FOR OLEFIN POLYMERIZATION CONTAINING THE SAME, AND METHOD FOR PRODUCING OLEFIN POLYMER USING CATALYST FOR OLEFIN POLYMERIZATION

TECHNICAL FIELD

The present invention relates to a metallocene compound, a catalyst component for olefin polymerization and a catalyst for olefin polymerization containing the same, and a method for producing an olefin polymer using the catalyst for olefin polymerization. More specifically, the invention relates to a metallocene compound having an aryl substituent or a heteroaryl substituent at the 3-position of cyclopentathiophene and having a bridged (cyclopentadiene)-(cyclopentathiophene) as a basic skeleton, a catalyst component for olefin polymerization and a catalyst for olefin polymerization containing the same, and a method for producing an olefin polymer (particularly, ethylene-based polymer) using the catalyst for olefin polymerization.

BACKGROUND ART

As a method for improving molding processability of a metallocene-based polyethylene that is generally poor in molding processability, there are known a method of blending a high-pressure process low density polyethylene into the metallocene-based polyethylene and a method of introducing long-chain branches into polyethylene by a polymerization reaction using a specific metallocene. Since the former requires a blending step, production costs become high. Moreover, the resulting blend is excellent in molding processability but mechanical strength that is an advantage of the metallocene-based polyethylene decreases. On the other hand, there is known a method of using a bridged bisindenyl compound (see, for example, Patent Document 1) or a geometrical constraint half metallocene (see, for example, Patent Document 2) as the latter specific metallocene for introducing the long-chain branches.

Furthermore, Patent Document 3 reports that, when homopolymerization of ethylene is performed by solution polymerization using an asymmetric metallocene, in which a cyclopentadienyl group and an indenyl group were bridged with carbon, and methylaluminoxane, it is possible to produce a polyethylene having branches.

In addition, Patent Document 4 reports a catalyst system for producing an ethylene polymer and an ethylene/butene copolymer that are each useful as a macromonomer, using, among asymmetric metallocenes in which a cyclopentadienyl group and an indenyl group were bridged with silicon, a metallocene having methyl groups at the 2, 4, and 7 positions of the indenyl group and a modified clay compound.

Furthermore, the present inventors have proposed in Patent Document 5, among asymmetric metallocenes in which a cyclopentadienyl group and an indenyl group were bridged with a bridging group, a supported catalyst for olefin polymerization containing, as an essential component, a specific asymmetric metallocene having no substituent other than the bridging group on the cyclopentadienyl group and having hydrogen or a specific substituent at the 3 position of the indenyl group and further, a method for producing an ethylene-based polymer having improved molding processability using the supported catalyst for olefin polymerization.

BACKGROUND ART DOCUMENTS

Patent Documents

Patent Document 1: JP-A-08-048711
Patent Document 2: JP-A-07-500622
Patent Document 3: JP-A-05-043619
Patent Document 4: JP-A-2008-050278
Patent Document 5: JP-A-2011-137146

SUMMARY OF THE INVENTION

Problems that the Invention is to Solve

However, according to Patent Documents 1 and 2, the number of terminal double bonds and long-chain branches of the resulted polymer are small and thus an effect of improving the molding processability is not yet sufficient.

According to Patent Document 3, the length of the branch is described to be a carbon number of 1 to 20 and the length of the branch is too short for exhibiting an effect of improving the molding processability as long-chain branches.

According to Patent Document 4, the number of the terminal double bonds of the polymer is small and there is no description of the formation of long-chain branches by the catalyst alone.

Moreover, according to Patent Document 5, since an ethylene-based polymer having a large degree of strain hardening of elongation viscosity is obtained, an improvement in molding processability is observed as compared with a conventional long-chain type polyethylene but the branching index of the long-chain branches does not yet reach that of the high-pressure process low density polyethylene, so that a further improvement of the long-chain branch structure has been required.

Under such circumstances, in order to improve the molding processability of the metallocene-based polyethylene, it is required to develop a method for producing a metallocene-based polyethylene having sufficient number and length of long-chain branches introduced therein early.

Considering the problems in the above-described conventional techniques, in order to improve the molding processability of the metallocene-based polyethylene, an object of the present invention is to provide a metallocene compound capable of producing an ethylene-based polymer having sufficient number and length of long-chain branches introduced therein, a catalyst component for olefin polymerization and a catalyst for olefin polymerization containing the same, and further a method for producing an olefin polymer (particularly, an ethylene-based polymer) using the catalyst for olefin polymerization.

Incidentally, in the present invention, the polyethylene is a generic name of an ethylene homopolymer and a copolymer of ethylene and an olefin to be mentioned later, and can be paraphrased as an ethylene-based polymer.

Means for Solving the Problems

As a result of extensive studies to solve the above-described problems, the present inventors have found that, when a novel metallocene compound having an aryl substituent or a heteroaryl substituent at the 3-position of cyclopentathiophene and having a bridged (cyclopentadiene)-(cyclopentathiophene) as a basic skeleton is used as a catalyst component for olefin polymerization and a catalyst composition obtained by combining the metallocene compound with a compound reacting with it to form a cationic metallocene compound and a fine particle carrier is used, a metallocene-based polyethylene having sufficient number and length of long-chain branches can be produced. Based on these findings, they have accomplished the present invention.

That is, the present invention provides:

[1] A metallocene compound represented by the following general formula (1):

[Chem 1]

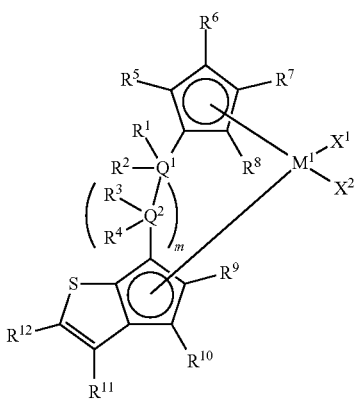

(1)

wherein $M^1$ represents any transition metal of Ti, Zr, and Hf; $X^1$ and $X^2$ represent each independently a hydrogen atom, a halogen, a hydrocarbon group having a carbon number of 1 to 20, an oxygen- or nitrogen-containing hydrocarbon group having a carbon number of 1 to 20, an amino group substituted with a hydrocarbon group having a carbon number of 1 to 20, or an alkoxy group having a carbon number of 1 to 20; $Q^1$ and $Q^2$ represent each independently a carbon atom, a silicon atom, or a germanium atom; $R^1$, $R^2$, $R^3$, and $R^4$ represent each independently a hydrogen atom or a hydrocarbon group having a carbon number of 1 to 10, and may form a ring together with at least one of $Q^1$ and $Q^2$ bonded thereto; m is 0 or 1 and, in the case of m is 0, $Q^1$ is directly bonded to a conjugated 5-membered ring containing $R^9$ and $R^{10}$; $R^5$, $R^6$, $R^7$, $R^8$, $R^9$, $R^{10}$, and $R^{12}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen-containing hydrocarbon group having a carbon number of 1 to 20, or a silyl group substituted with a hydrocarbon group having a carbon number of 1 to 20; and $R^{11}$ represents a substituted or unsubstituted aryl group represented by the following general formula (1-a):

[Chem 2]

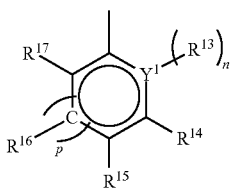

(1-a)

wherein $Y^1$ represents an atom of Group 14, 15, or 16 of the Periodic Table; $R^{13}$, $R^{14}$, $R^{15}$, $R^{16}$, and $R^{17}$ represent each independently a hydrogen atom, a halogen atom, a hydrocarbon group having a carbon number of 1 to 20, an oxygen- or nitrogen-containing hydrocarbon group having a carbon number of 1 to 20, an amino group substituted with a hydrocarbon group having a carbon number of 1 to 20, an alkoxy group having a carbon number of 1 to 20, a silicon-containing hydrocarbon group having a carbon number of 1 to 18, which contains a silicon number of 1 to 6, a halogen-containing hydrocarbon group having a carbon number of 1 to 20, or a silyl croup substituted with a hydrocarbon group having a carbon number of 1 to 20, and adjacent substituents of $R^{13}$, $R^{14}$, $R^{15}$, $R^{16}$, and $R^{17}$ may form a ring together with atoms bonded thereto; n is 0 or 1 and, in case of n is 0, the substituent $R^{13}$ is not present on $Y^1$; p is 0 or 1 and, in case of p is 0, the substituent $R^{16}$ and the carbon atom to which $R^{16}$ is bonded are not present and the carbon atom to which $R^{15}$ is bonded and the carbon atom to which $R^{17}$ is bonded are directly bonded.

[2] A metallocene compound represented by the following general formula (2);

[Chem 3]

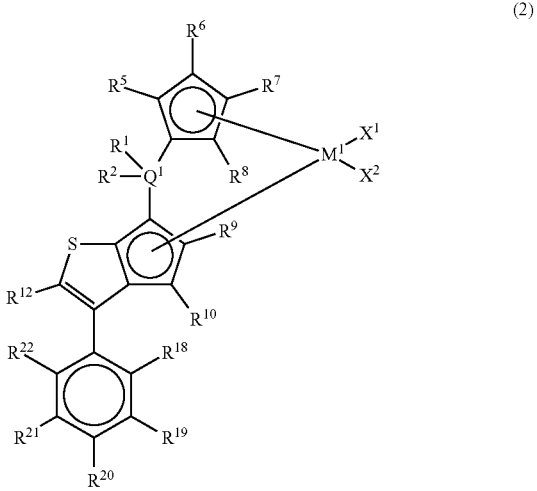

(2)

wherein $M^1$ represents any transition metal of Ti, Zr, and Hf; $X^1$ and $X^2$ represent each independently a hydrogen atom, a halogen, a hydrocarbon group having a carbon number of 1 to 20, an oxygen- or nitrogen-containing hydrocarbon group having a carbon number of 1 to 20, an amino group substituted with a hydrocarbon group having a carbon number of 1 to 20, or an alkoxy group having a carbon number of 1 to 20; $Q^1$ represents a carbon atom, a silicon atom, or a germanium atom; $R^1$ and $R^2$ represent each independently a hydrogen atom or a hydrocarbon group having a carbon number of 1 to 10, and may form a ring together with $Q^1$ bonded thereto; $R^5$, $R^6$, $R^7$, $R^8$, $R^9$, $R^{10}$, and $R^{12}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen-containing hydrocarbon group having a carbon number of 1 to 20, or a silyl group substituted with a hydrocarbon group having a carbon number of 1 to 20; $R^{18}$, $R^{19}$, $R^{20}$, $R^{21}$, and $R^{22}$ represent each independently a hydrogen atom, a halogen atom, a hydrocarbon group having a carbon number of 1 to 20, an oxygen- or nitrogen-containing hydrocarbon group having a carbon number of 1 to 20, an amino group substituted with a hydrocarbon group having a carbon number of 1 to 20, an alkoxy group having a carbon number of 1 to 20, a silicon-containing hydrocarbon group having a carbon number of 1 to 18, which contains a silicon number of 1 to 6, a halogen-containing hydrocarbon group having a carbon number of 1 to 20, or a silyl group substituted with a hydrocarbon group having a carbon number of 1 to 20, and adjacent substituents of $R^{18}$, $R^{19}$, $R^{20}$, $R^{21}$, and $R^{22}$ may form a ring together with atoms bonded thereto,

[3] A metallocene compound represented by the following general formula (3):

[Chem 4]

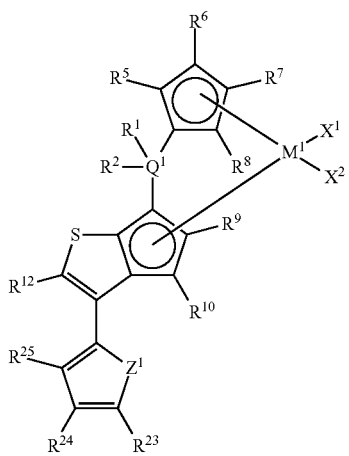

(3)

wherein $M^1$ represents any transition metal of Ti, Zr, and Hf; $X^1$ and $X^2$ represent each independently a hydrogen atom, a halogen, a hydrocarbon group having a carbon number of 1 to 20, an oxygen- or nitrogen-containing hydrocarbon group having a carbon number of 1 to 20, an amino group substituted with a hydrocarbon group having a carbon number of 1 to 20, or an alkoxy group having a carbon number of 1 to 20; $Q^1$ represents a carbon atom, a silicon atom, or a germanium atom; $R^1$ and $R^2$ represent each independently a hydrogen atom or a hydrocarbon group having a carbon number of 1 to 10, and may form a ring together with $Q^1$ bonded thereto; $R^5$, $R^6$, $R^7$, $R^8$, $R^9$, $R^{10}$, and $R^{12}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen-containing hydrocarbon group having a carbon number of 1 to 20, or a silyl group substituted with a hydrocarbon group having a carbon number of 1 to 20; $Z'$ represents an oxygen atom or a sulfur atom; $R^{23}$, $R^{24}$, and $R^{25}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen-containing hydrocarbon group having a carbon number of 1 to 20, or a silyl group substituted with a hydrocarbon group having a carbon number of 1 to 20, and adjacent substituents of $R^{23}$, $R^{24}$, and $R^{25}$ may form a ring together with carbon atoms bonded thereto.

[4] The metallocene compound according to any one of the [1] to [3], wherein $Q^1$ is a silicon atom in the above general formula (1), (2), or (3).

[5] The metallocene compound according to any one of the [1] to [4], wherein $R^9$ is a hydrogen atom in the above general formula (1), (2), or (3),

[6] The metallocene compound according to any one of the [1] to [5], wherein $M^1$ is zirconium or hafnium in the above general formula (1), (2), or (3).

[7] The metallocene compound according to any one of the [1] to [6], wherein $M^1$ is zirconium in the above general formula (1), (2), or (3).

[8] A catalyst component for olefin polymerization, comprising the metallocene compound according to any one of the [1] to [7].

[9] A catalyst for olefin polymerization, comprising the metallocene compound according to any one of the [1] to [7].

[10] A catalyst for olefin polymerization, comprising the following essential components (A), (B) and (C):

Component (A): the metallocene compound according, to any one of the [1] to [7], Component (B): a compound reacting with the metallocene compound of the component (A) to form a cationic metallocene compound, and Component (C): a fine particle carrier.

[11] The catalyst for olefin polymerization according to the [10], wherein the component (B) is an aluminoxane.

[12] The catalyst for olefin polymerization according to the [10] or [11], wherein the component (C) is silica.

[13] The catalyst for olefin polymerization according to any one of the [10] to [12], which further comprises the following component (D):

Component (D): an organoaluminum compound.

[14] A method for producing an olefin-based polymer, comprising polymerizing an olefin using the catalyst for olefin polymerization according to any one of the [9] to [13].

[15] The method for producing an olefin-based polymer according to the [14], wherein the olefin contains at least ethylene.

[16] The method for producing an olefin-based polymer according to the [15], wherein the olefin-based polymer is an ethylene-based polymer.

Advantage of the Invention

The metallocene compound of the present invention is a novel metallocene compound having an aryl substituent or a heteroaryl substituent at the 3-position of cyclopentathiophene and having a bridged (cyclopentadiene)-(cyclopentathiophene) as a basic skeleton and can produce a metallocene-based polyethylene having sufficient number and length of long-chain branches. Also, by using the metallocene compound of the present invention as a catalyst component for olefin polymerization, there can be obtained an olefin-based polymer (particularly, an ethylene-based polymer) having sufficient number and length of long-chain branches introduced therein and having farther improved molding processability.

MODE FOR CARRYING OUT THE INVENTION

Figure 1:
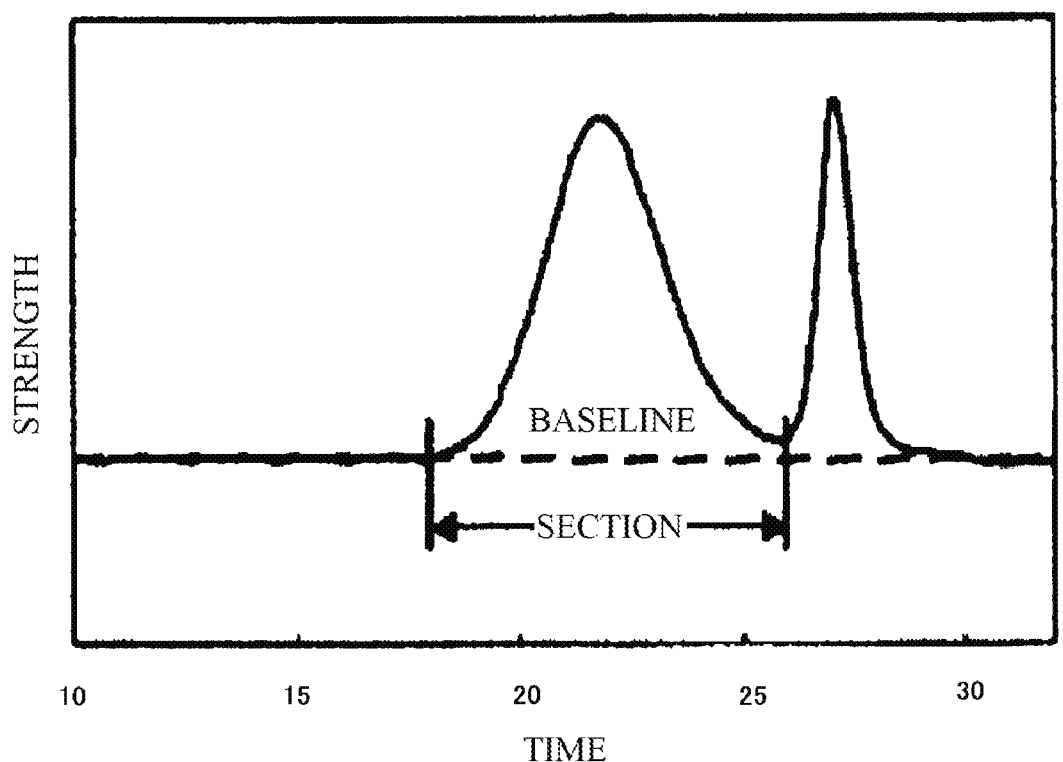
FIG. 1 is a drawing explaining a baseline and a section of a chromatogram in GPC.

The following will describe the metallocene compound of the present invention, a catalyst component for olefin polymerization and a catalyst for olefin polymerization containing the same, and a method for producing an olefin polymer using the catalyst for olefin polymerization in detail.

1. Metallocene Compound

The metallocene compound of the present invention is characterized in that a cyclopentadienyl ring and a cyclopentathiophenyl ring represented by the following general formula (1) are bridged and further the 3-position ($R^{11}$) of the cyclopentathiophene ring represents a substituted or unsubstituted aryl group or heteroaryl group (hereinafter, sometimes referred to as "specific aryl group").

[Chem 5]

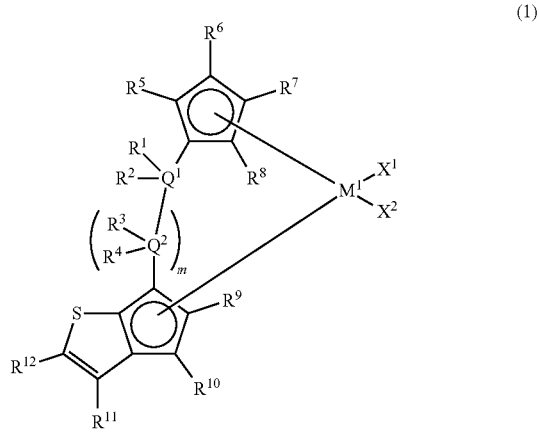

(1)

In the metallocene compound of the present invention, since the cyclopentadienyl ring and the cyclopentathiophenyl ring are bridged and a specific aryl group is present at the 3-position ($R^{11}$) of the cyclopentathiophene ring, both of the formation of a macromer (terminal vinyl polymer) by β-hydrogen elimination and copolymerization of the macromer can be performed by using the metallocene compound of the present invention as a catalyst component for olefin polymerization. Therefore, when a catalyst containing the metallocene compound of the present invention is used, sufficient number and length of long-chain branches are introduced and an olefin-based polymer (particularly, an ethylene-based polymer) having further improved molding processability can be obtained.

In the metallocene compound of the present invention, the most important structure for forming the long-chain branches is that a cyclopentathiophene ring is used as a basic skeleton and a specific aryl group is present at the 3-position ($R^{11}$) thereof. The cyclopentathiophene ring can combine with a metal as a monovalent anion similarly to an indene ring. However, there is a difference in structure that an indene ring is composed of a 5-membered ring structure that directly combines with a metal and a 6-membered ring that is condensed therewith but a cyclopentathiophene ring is composed of a structure in which a sulfur-containing 5-membered ring structure is condensed with a 5-membered ring structure that directly combines with a metal. Therefore, it is presumed that a specific aryl group that is substituted to the 3-position ($R^{11}$) of the cyclopentathiophene ring may generate a difference in a steric effect in a polymerization reaction from the case where the aryl group is substituted to the corresponding position (4-position) on the indene ring. Specifically, in the case of the cyclopentathiophene ring, since the specific aryl group that is substituted to the 3-position is disposed at a position sterically far from the metal as compared with the case of the indene ring, it is presumed that the β-hydrogen elimination reaction is accelerated and thus the formation of the macromer (terminal vinyl polymer) important for the formation of the long-chain branch structure in the polymer is accelerated.

In the general formula (1), $M^1$ represents any transition metal of Ti, Zr, and Hf, preferably Zr or Hf, and more preferably Zr.

In the general formula (1), $X^1$ and $X^2$ represent each independently a hydrogen atom, a halogen, a hydrocarbon group having a carbon number of 1 to 20, an oxygen- or nitrogen-containing hydrocarbon group having a carbon number of 1 to 20, an amino group substituted with a hydrocarbon group having a carbon number of 1 to 20, or an alkoxy group having a carbon number of 1 to 20.

The halogen represented by $X^1$ and $X^2$ includes a chlorine atom, a bromine atom, an iodine atom, and the like. The hydrocarbon group having a carbon number of 1 to 20 represented by $X^1$ and $X^2$ includes an alkyl group, an aryl group, and the like and examples thereof include a methyl group, an ethyl group, an n-propyl group, an i-propyl group, an n-butyl group, an i-butyl group, a t-butyl group, an n-pentyl group, a neopentyl group, a cyclopentyl group, an n-hexyl group, a cyclohexyl group, a phenyl group, a benzyl group, a naphthyl group, and the like.

The oxygen-containing hydrocarbon group having a carbon number of 1 to 20 represented by $X^1$ and $X^2$ includes hydrocarbon groups having an ether-bond, a carbonyl group, an ester bond, a heteroaryl group, or the like, and examples thereof include a methoxymethyl group, an ethoxymethyl group, an n-propoxymethyl group, an i-propoxymethyl group, an n-butoxymethyl group, an i-butoxymethyl group, a t-butoxymethyl group, a methoxyethyl group, an ethoxyethyl group, an acetyl group, a 1-oxopropyl group, a 1-oxo-n-butyl group, a 2-methyl-1-oxopropyl group, a 2,2-dimethyl-1-oxo-propyl group, a phenylacetyl group, a diphenylacetyl group, a benzoyl group, a 2-methoxyphenyl group, a 3-methoxyphenyl group, a 4-methoxyphenyl group, a 2-furyl group, a 2-tetrahydrofuryl group, a 2-(5-methyl) furyl group, and the like. The nitrogen-containing hydrocarbon group having a carbon number of 1 to 20 includes hydrocarbon groups having an amino group, an imino group, a nitrile group, a pyridyl group, a pyrrole group, an imidazole group, a pyrozole group, an indole group, or the like, and examples thereof include a dimethylaminomethyl group, a diethylaminomethyl group, a di-i-propylaminomethyl group, a bis(dimethylamino)methyl group, a bis(di-i-propylamino)methyl group, a (dimethylamino)(phenyl)methyl group, a methylimino group, an ethylimino group, a 1-(methylimino)ethyl group, a 1-(phenylimino)ethyl group, a 1-[(phenylmethyl)imino]ethyl group, and the like.

Examples of the amino group substituted with a hydrocarbon group having a carbon number of 1 to 20 represented by $X^1$ and $X^2$ include a dimethylamino group, a diethyl amino group, a di-n-propyl amino group, a di-i-propylamino group, a di-n-butylamino group, a di-i-butylamino group, a di-t-butylamino group, a diphenylamino group, and the like.

Examples of the alkoxy group having a carbon number of 1 to 20 represented by $X^1$ and $X^2$ include a methoxy group, an ethoxy group, an n-propoxy group, an i-propoxy group, an n-butoxy group, an i-butoxy group, a t-butoxy group, a phenoxy group, and the like.

Preferred $X^1$ and $X^2$ include a halogen, an alkyl group having a carbon number of 1 to 4, an alkoxy group having a carbon number of 1 to 6, and an amino group substituted with a hydrocarbon group having a carbon number of 1 to 6. Among them, there may be mentioned a chlorine atom, a bromine atom, a methyl group, an n-butyl group, an i-butyl group, a methoxy group, an ethoxy group, an i-propoxy group, an n-butoxy group, a phenoxy group, a dimethylamino group, and a di-i-propylamino group. Of these, a chlorine atom, a methyl group, and a dimethylamino group are particularly preferred.

In the general formula (1), $Q^1$ and $Q^2$ represent each independently a carbon atom, a silicon atom, or a germanium atom, preferably a carbon atom or a silicon atom, and more preferably a silicon atom.

In the general formula (1), $R^1$, $R^2$, $R^3$, and $R^4$ represent each independently a hydrogen atom or a hydrocarbon group having a carbon number of 1 to 10, and may form a ring together with at least one of $Q^1$ and $Q^2$ bonded thereto. m is 0 or 1 and, in the case of m is 0, $Q^1$ is directly bonded to a conjugated 5-membered ring containing $R^9$ and $R^{10}$.

The hydrocarbon group having a carbon number of 1 to 10 represented by $R^1$, $R^2$, $R^3$, and $R^4$ includes alkyl groups, aryl groups, and the like, and examples thereof include a methyl group, an ethyl group, an n-propyl group, an i-propyl group, an n-butyl group, an i-butyl group, a t-butyl group, an n-pentyl group, a neopentyl group, a cyclopentyl group, an n-hexyl group, a cyclohexyl group, a phenyl group, and the like.

Moreover, as the cases where $R^1$ and $R^2$ form a ring together with $Q^1$ bonded thereto or $R^3$ and $R^4$ form a ring together with $Q^2$ bonded thereto, there may be mentioned a cyclobutylidene group, a cyclopentylidene group, a cyclohexylidene group, a silacyclobutyl group, a silacyclopentyl group, a silacyclohexyl group, and the like. Furthermore, as the case where $R^1$, $R^2$, $R^3$, and $R^4$ form a ring together with $Q^1$ and $Q^2$ bonded thereto, a cyclohexylene group and the like may be mentioned.

Preferred $R^1$, $R^2$, $R^3$, and $R^4$ include a hydrogen atom, a methyl group, an ethyl group, a phenyl group, an ethylene group, and a cyclobutylidene group in the case where $Q^1$ and/or $Q^2$ are a carbon atom, and include a methyl group, an ethyl group, a phenyl group, and a silacyclobutyl group in the case where $Q^1$ and/or $Q^2$ are a silicon atom.

In the general formula (1), $R^5$, $R^6$, $R^7$, $R^8$, $R^9$, $R^{10}$, and $R^{12}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen-containing hydrocarbon group having a carbon number of 1 to 20, or a silyl group substituted with a hydrocarbon group having a carbon number of 1 to 20.

In the general formula (1), when at least one of $R^5$, $R^6$, $R^7$, and $R^8$ has a substituent as in the ease of a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen-containing hydrocarbon group having a carbon number of 1 to 20, or a silyl group substituted with a hydrocarbon group having a carbon number of 1 to 20, polymerization activity is particularly enhanced, so that the case is preferred. The number of the above-described substituents different from a hydrogen atom, which are contained in $R^5$, $R^6$, $R^7$, and $R^8$, may be any of 1 or more and 4 or less but is preferably 2 or more and 4 or less.

As specific examples of the substituents other than a hydrogen atom, which are represented by each of $R^5$, $R^6$, $R^7$, $R^8$, $R^9$, $R^{10}$, and $R^{12}$, with regard to the halogen, the hydrocarbon group having a carbon number of 1 to 20, or the oxygen-containing hydrocarbon group having a carbon number of 1 to 20, there may be mentioned those the same as the groups represented in the description of the aforementioned $X^1$ and $X^2$.

Examples of the silicon-containing hydrocarbon group having a carbon number of 1 to 18, which contains a silicon number of 1 to 6, include a bis(trimethylsilyl)methyl group, a bis(t-butyldimethylsilyl)methyl group, and the like, and examples of the halogen-containing hydrocarbon group having a carbon number of 1 to 20 include a bromomethyl group, a chloromethyl group, a trifluoromethyl group, a 2-chloroethyl group, a 2-bromoethyl group, a 2-bromopropyl group, a 3-bromopropyl group, a 2-bromocyclopropyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, and the like.

Moreover, the silyl group substituted with a hydrocarbon group having a carbon number of 1 to 20 includes trialkylsilyl groups, dialkylmonoarylsilyl groups, monoalkyldiarylsilyl groups, triarylsilyl groups, and the like, and examples thereof include a trimethylsilyl group, a tri-t-butylsilyl group, a di-t-butylmethylsilyl group, a t-butyldimethylsilyl group, a triphenylsilyl group, a diphenylmethylsilyl group, a phenyldimethylsilyl group, and the like.

Preferred $R^5$, $R^6$, $R^7$, $R^8$, $R^9$, $R^{10}$, and $R^{12}$ are a hydrogen atom, a hydrocarbon group having a carbon number of 1 to 20, or a silyl group substituted with a hydrocarbon group having a carbon number of 1 to 20, more preferred is a hydrogen atom, a hydrocarbon group having a carbon number of 1 to 10, or a silyl group substituted with a hydrocarbon group having a carbon number of 1 to 18, and still further preferred is a hydrogen atom, a hydrocarbon group having a carbon number of 1 to 6, or a silyl group substituted with a hydrocarbon group having a carbon number of 1 to 6.

Examples of the hydrocarbon group having a carbon number of 1 to 10 include alkyl groups having a carbon number of 1 to 10, phenyl groups which may substituted with an alkyl group having a carbon number of 6 to 10, and a naphthyl group. Preferred examples of the silyl group substituted with a hydrocarbon group having a carbon number of 1 to 18 include a trimethylsilyl group, an ethyldimethylsilyl group, an n-propyldimethylsilyl group, an i-propyldimethylsilyl group, an n-butyldimethylsilyl group, an i-butyldimethylsilyl group, a t-butyldimethylsilyl group, a triethylsilyl group, a t-butyldiethylsilyl group, a tri-i-propylsilyl group, a dimethylphenylsilyl group, a methyldiphenylsilyl group, and a t-butyldiphenylsilyl group.

Moreover, preferred examples of the hydrocarbon group having a carbon number of 1 to 6 include alkyl groups having a carbon number of 1 to 6, and preferred examples of the alkyl group having a carbon number of 1 to 6 include a methyl group, an ethyl group, an n-propyl group, an i-propyl group, an n-butyl group, an i-butyl group, a t-butyl group, an n-pentyl group, a neopentyl group, a cyclopentyl group, an n-hexyl group, and a cyclohexyl group.

Particularly preferred $R^5$, $R^6$, $R^7$, $R^8$, $R^9$, $R^{10}$, and $R^{12}$ are a hydrogen atom, an alkyl group having a carbon number of 1 to 6, or a silyl group substituted with a hydrocarbon group having a carbon number of 1 to 6. As the substituents other than the hydrogen atom, more preferred is a methyl group, an ethyl group, an n-propyl group, an i-propyl group, an n-butyl group, an i-butyl group, a t-butyl group, a trimethylsilyl group, a triethylsilyl group, or a t-butyldimethylsilyl group, and further preferred is a methyl group, a t-butyl group, or a trimethylsilyl group.

The substituent $R^{11}$ represents a substituted or unsubstituted aryl group having a structure represented by the above general formula (1-a). $Y^1$ in the general formula (1-a) is preferably any of a carbon atom, a nitrogen atom, an oxygen atom, and a sulfur atom and further preferably any of a carbon atom, an oxygen atom, and a sulfur atom. Preferred unsubstituted aryl group having the structure represented by the above general formula (1-a) includes a phenyl group, a furyl group, a thienyl group, and the like.

In the general formula (1-a), $R^{13}$, $R^{14}$, $R^{15}$, $R^{16}$, and $R^{17}$ represent each independently a hydrogen atom, a halogen atom, a hydrocarbon group having a carbon number of 1 to 20, an oxygen- or nitrogen-containing hydrocarbon group having a carbon number of 1 to 20, an amino group substituted with a hydrocarbon group having a carbon number of 1 to 20, an alkoxy group having a carbon number of 1 to 20, a silicon-containing hydrocarbon group having a carbon number of 1 to 13, which contains a silicon number of 1 to 6, a halogen-containing hydrocarbon group having a carbon number of 1 to 20, or a silyl group substituted with a hydrocarbon group having a carbon number of 1 to 20, and adjacent substituents of $R^{13}$, $R^{14}$, $R^{15}$, $R^{16}$, and $R^{17}$ may form one or more rings together with atoms bonded thereto.

As specific examples of the substituents other than a hydrogen atom, which are represented by each of $R^{13}$, $R^{14}$, $R^{15}$, $R^{16}$, and $R^{17}$, there may be mentioned those the same as the groups shown in the description of the aforementioned $X^1$ and $X^2$ and $R^5$, $R^6$, $R^7$, $R^8$, $R^9$, $R^{10}$, and $R^{12}$.

The substituted or unsubstituted aryl group having a structure represented by the above general formula (1-a) in the substituent $R^{11}$ specifically includes a phenyl group, a 4-methylphenyl group, a 4-i-propylphenyl group, a 4-t-butylphenyl group, a 4-biphenyl group, a 2,6-dimethylphenyl group, a 2,5-dimethylphenyl group, a 3,5-dimethylphenyl group, a 3,5-i-propylphenyl group, a 3,5-t-butylphenyl group, a 2,4,6-trimethylphenyl group, a 2,3,5,6-tetramethylphenyl group, a 2,3,4,5,6-pentamethylphenyl group, a 4-trimethylsilylphenyl group, a 4-(t-butyldimethylsilyl)phenyl group, 3,5-bistrimethylsilylphenyl group, a 4-fluorophenyl group, a 4-chlorophenyl group, a 4-bromophenyl group, a 4-trifluoromethylphenyl group, a 3,5-difluorophenyl group, a 3,5-dichlorophenyl group, a 2,4,6-trifluorophenyl group, a 3,4,5-trifluorophenyl group, a 2,4,6-trichlorophenyl group, a 2,3,5,6-tetrafluorophenyl group, 2,3,4,5,6-pentafluorophenyl group, a 4-methoxyphenyl group, a 4-ethoxyphenyl group, a 4-isopropoxyphenyl group, a 4-n-butoxyphenyl group, a 4-phenoxyphenyl group, a 3,5-dimethoxyphenyl group, a 2-furyl group, a 2-(5-methyl)furyl group, a 2-(5-n-propyl)furyl group, a 2-(5-i-propyl)furyl group, a 2-(5-n-butyl)furyl group, a 2-(5-i-butyl)furyl group, a 2-(5-t-butyl)furyl group, a 2-(5-trimethylsilyl)furyl group, a 2-(5-triethylsilyl)furyl group, a 2-(5-phenyl)furyl group, a 2-(5-tolyl)furyl group, a 2-(5-fluorophenyl)furyl group, a 2-(5-chlorophenyl)furyl group, a 2-(4,5-dimethyl)furyl group, a 2-benzofuryl group, a 2-thienyl group, a 2-(5-methyl)thienyl group, a 2-(5-t-butyl)thienyl group, a 2-(5-trimethylsilyl)thienyl group, a 2-(4,5-dimethyl)thienyl group, and the like.

Moreover, adjacent substituents of $R^{13}$, $R^{14}$, $R^{15}$, $R^{16}$, and $R^{17}$ may form one or more aromatic ring or aliphatic rings together with atoms bonded thereto.

Preferred examples of the aromatic ring or aliphatic ring to be formed include a 1-naphthyl group, a 2-naphthyl group, a 1-anthryl group, a 2-anthryl group, a 9-anthryl group, a 1-phenanthryl group, a 2-phenanthryl group, a 3-phenanthryl group, a 4-phenanthryl group, a 9-phenanthryl group, a 5-1,2,3,4-tetrahydronaphthyl group, a 6-1,2,3,4-tetrahydronaphthyl group, and a 9-1,2,3,4,5,6,7,8-octahydroanthryl group. Of these, a 1-naphthyl group, a 2-naphthyl group, and a 9-anthryl group are more preferred, and a 1-naphthyl group and a 2-naphthyl group are further preferred.

In addition, in the general formula (1), m is 0 or 1 and, in the case of m is 0, $Q^1$ is directly bonded to a conjugated 5-membered ring containing $R^9$ and $R^{10}$.

The metallocene compound of the present invention is preferably one represented by the following general formula (2).

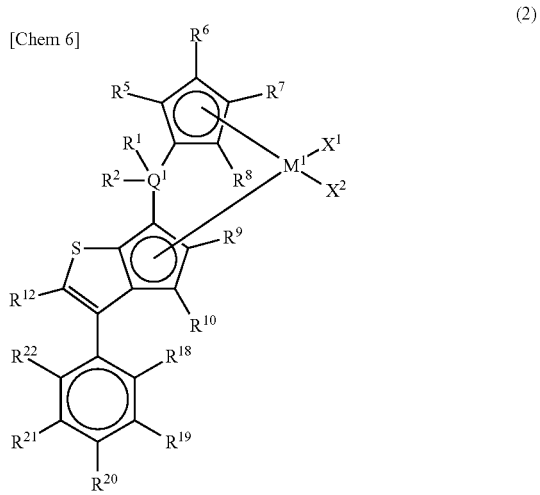

(2)

[Chem 6]

In the metallocene compound represented by the above general formula (2), as $M^1$, $X^1$, $X^2$, $Q^1$, $R^1$, $R^2$, $R^5$, $R^6$, $R^7$, $R^8$, $R^9$, $R^{10}$, and $R^{12}$, structures the same as the atoms and groups represented in the description of the metallocene compound represented by the aforementioned general formula (1) can be selected. Moreover, as $R^{18}$, $R^{19}$, $R^{20}$, $R^{21}$, and $R^{22}$, structures the same as the atoms and groups of $R^{13}$, $R^{14}$, $R^{15}$, $R^{16}$, and $R^{17}$ represented in the description of the metallocene compound represented by the aforementioned general formula (1) can be selected.

In addition, the metallocene compound of the present invention is preferably one represented by the following general formula (3) similar to the above general formula (2).

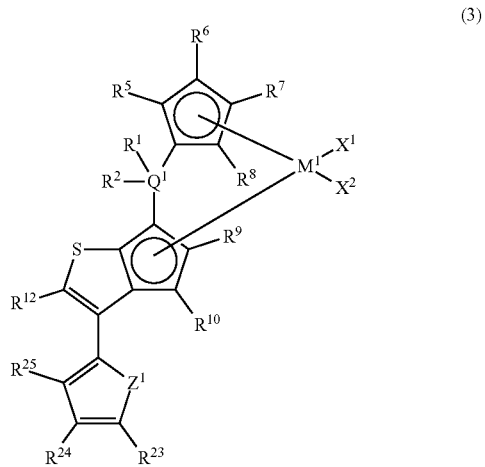

(3)

In the metallocene compound represented by the above general formula (3), as $M^1$, $X^1$, $X^2$, $Q^1$, $R^1$, $R^2$, $R^5$, $R^6$, $R^7$, $R^8$, $R^9$, $R^{10}$, and $R^{12}$, structures the same as the atoms and groups represented in the description of the metallocene compound represented by the aforementioned general formula (1) can be selected. Moreover, as $R^{23}$, $R^{24}$, and $R^{25}$, structures the same as the atoms and groups of $R^{13}$, $R^{14}$, $R^{15}$, $R^{16}$, and $R^{17}$ represented in the description of the metallocene compound represented by the aforementioned general formula (1) can be selected. $Z^1$ represents an oxygen atom or a sulfur atom.

As the metallocene compound of the present invention, among the compounds represented by the above general formula (1), a compound represented by the following general formula (4) may be mentioned as a preferred compound.

In the metallocene compound represented by the above general formula (4), as $M^1$, $X^1$, $X^2$, Q, $R^1$, $R^2$, $R^9$, $R^{11}$, and $R^{12}$, configurations the same as the atoms and groups represented in the description of the metallocene compound represented by the aforementioned general formula (1) can be selected.

Specific examples of the metallocene compound of the present invention are shown in the following general formula (1') and Tables 1 to 5 but are not limited thereto.

Incidentally, in the following Tables, abbreviations are as follows.

Me: methyl, Et: ethyl, Pr: propyl, Bu: butyl, Ph: phenyl, Cp: cyclopentadienyl

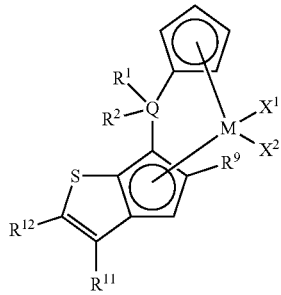

(4)

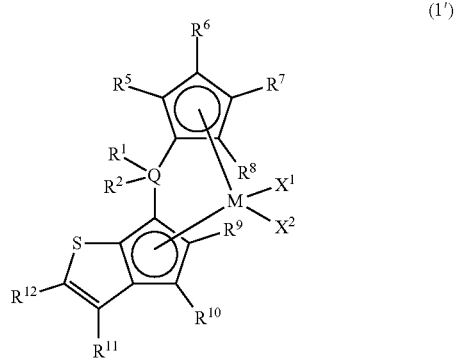

(1')

TABLE 1

| Number | M | $X^1$, $X^2$ | $R^1R^2Q$ | $R^9$ | $R^5R^6R^7R^8Cp$ | $R^{10}$ | $R^{11}$ | $R^{12}$ |
|---|---|---|---|---|---|---|---|---|
| 1 | Zr | Cl | Me$_2$Si | Me | Cp | H | Ph | Me |
| 2 | Zr | Cl | Me$_2$Si | Me | Cp | H | 4-Me—Ph | Me |
| 3 | Zr | Cl | Me$_2$Si | Me | Cp | H | 4-$^i$Pr—Ph | Me |
| 4 | Zr | Cl | Me$_2$Si | Me | Cp | H | 4-$^t$Bu—Ph | Me |
| 5 | Zr | Cl | Me$_2$Si | Me | Cp | H | 4-Ph—Ph | Me |
| 6 | Zr | Cl | Me$_2$Si | Me | Cp | H | 4-MeO—Ph | Me |
| 7 | Zr | Cl | Me$_2$Si | Me | Cp | H | 4-PhO—Ph | Me |
| 8 | Zr | Cl | Me$_2$Si | Me | Cp | H | 4-F—Ph | Me |
| 9 | Zr | Cl | Me$_2$Si | Me | Cp | H | 4-Cl—Ph | Me |
| 10 | Zr | Cl | Me$_2$Si | Me | Cp | H | 4-CF$_3$—Ph | Me |
| 11 | Zr | Cl | Me$_2$Si | Me | Cp | H | 2,6-Me$_2$—Ph | Me |
| 12 | Zr | Cl | Me$_2$Si | Me | Cp | H | 2,5-Me$_2$—Ph | Me |
| 13 | Zr | Cl | Me$_2$Si | Me | Cp | H | 3,5-Me$_2$—Ph | Me |
| 14 | Zr | Cl | Me$_2$Si | Me | Cp | H | 3,5-$^i$Pr$_2$—Ph | Me |
| 15 | Zr | Cl | Me$_2$Si | Me | Cp | H | 3,5-$^t$Bu$_2$—Ph | Me |
| 16 | Zr | Cl | Me$_2$Si | Me | Cp | H | 3,5-(MeO)$_2$—Ph | Me |
| 17 | Zr | Cl | Me$_2$Si | Me | Cp | H | 3,5-F$_2$—Ph | Me |
| 18 | Zr | Cl | Me$_2$Si | Me | Cp | H | 3,5-Cl$_2$—Ph | Me |
| 19 | Zr | Cl | Me$_2$Si | Me | Cp | H | 2,4,6-Me$_3$—Ph | Me |
| 20 | Zr | Cl | Me$_2$Si | Me | Cp | H | 2,4,6-F$_3$—Ph | Me |
| 21 | Zr | Cl | Me$_2$Si | Me | Cp | H | 3,4,5-F$_3$—Ph | Me |
| 22 | Zr | Cl | Me$_2$Si | Me | Cp | H | 2,3,5,6-Me$_4$—Ph | Me |
| 23 | Zr | Cl | Me$_2$Si | Me | Cp | H | 2,3,5,6-F$_4$—Ph | Me |
| 24 | Zr | Cl | Me$_2$Si | Me | Cp | H | 2,3,4,5,6-Me$_5$—Ph | Me |
| 25 | Zr | Cl | Me$_2$Si | Me | Cp | H | 2,3,4,5,6-F$_5$—Ph | Me |
| 26 | Zr | Br | Me$_2$Si | Me | Cp | H | Ph | Me |
| 27 | Zr | Me | Me$_2$Si | Me | Cp | H | Ph | Me |
| 28 | Zr | NMe$_2$ | Me$_2$Si | Me | Cp | H | Ph | Me |
| 29 | Zr | OCH$_3$ | Me$_2$Si | Me | Cp | H | Ph | Me |
| 30 | Zr | OEt | Me$_2$Si | Me | Cp | H | Ph | Me |
| 31 | Zr | O$^t$Bu | Me$_2$Si | Me | Cp | H | Ph | Me |
| 32 | Zr | OPh | Me$_2$Si | Me | Cp | H | Ph | Me |
| 33 | Zr | Cl | Me$_2$Si | Et | Cp | H | Ph | Me |
| 34 | Zr | Cl | Me$_2$Si | $^n$Pr | Cp | H | Ph | Me |
| 35 | Zr | Cl | Me$_2$Si | $^i$Pr | Cp | H | Ph | Me |
| 36 | Zr | Cl | Me$_2$Si | $^n$Bu | Cp | H | Ph | Me |
| 37 | Zr | Cl | Me$_2$Si | $^i$Bu | Cp | H | Ph | Me |
| 38 | Zr | Cl | Me$_2$Si | $^t$Bu | Cp | H | Ph | Me |

TABLE 1-continued

| Number | M | X$^1$, X$^2$ | R$^1$R$^2$Q | R$^9$ | R$^5$R$^6$R$^7$R$^8$Cp | R$^{10}$ | R$^{11}$ | R$^{12}$ |
|---|---|---|---|---|---|---|---|---|
| 39 | Zr | Cl | Me$_2$Si | Ph | Cp | H | Ph | Me |
| 40 | Zr | Cl | Me$_2$Si | 1-naphthyl | Cp | H | Ph | Me |

TABLE 2

| Number | M | X$^1$, X$^2$ | R$^1$R$^2$Q | R$^9$ | R$^5$R$^6$R$^7$R$^8$Cp | R$^{10}$ | R$^{11}$ | R$^{12}$ |
|---|---|---|---|---|---|---|---|---|
| 41 | Zr | Cl | Me$_2$Si | trimethylsilyl | Cp | H | Ph | Me |
| 42 | Zr | Cl | Et$_2$Si | Me | Cp | H | Ph | Me |
| 43 | Zr | Cl | Ph$_2$Si | Me | Cp | H | Ph | Me |
| 44 | Zr | Cl | Silacyclobutylene | Me | Cp | H | Ph | Me |
| 45 | Zr | Cl | Me$_2$Si | Me | Cp | H | 2-furyl | Me |
| 46 | Zr | Cl | Me$_2$Si | Me | Cp | H | 5-Me-2-furyl | Me |
| 47 | Zr | Cl | Me$_2$Si | Me | Cp | H | 5-$^n$Pr-2-furyl | Me |
| 48 | Zr | Cl | Me$_2$Si | Me | Cp | H | 5-$^i$Pr-2-furyl | Me |
| 49 | Zr | Cl | Me$_2$Si | Me | Cp | H | 5-$^n$Bu-2-furyl | Me |
| 50 | Zr | Cl | Me$_2$Si | Me | Cp | H | 5-$^i$Bu-2-furyl | Me |
| 51 | Zr | Cl | Me$_2$Si | Me | Cp | H | 5-$^t$Bu-2-furyl | Me |
| 52 | Zr | Cl | Me$_2$Si | Me | Cp | H | 5-trimethylsilyl-2-furyl | Me |
| 53 | Zr | Cl | Me$_2$Si | Me | Cp | H | 5-triethylsilyl-2-furyl | Me |
| 54 | Zr | Cl | Me$_2$Si | Me | Cp | H | 5-Ph-2-furyl | Me |
| 55 | Zr | Cl | Me$_2$Si | Me | Cp | H | 5-tolyl-2-furyl | Me |
| 56 | Zr | Cl | Me$_2$Si | Me | Cp | H | 5-fluorophenyl-2-furyl | Me |
| 57 | Zr | Cl | Me$_2$Si | Me | Cp | H | 5-chlorophenyl-2-furyl | Me |
| 58 | Zr | Cl | Me$_2$Si | Me | Cp | H | 4,5-Me$_2$-2-furyl | Me |
| 59 | Zr | Cl | Me$_2$Si | Me | Cp | H | 2-benzofuryl | Me |
| 60 | Zr | Cl | Me$_2$Si | Me | Cp | H | 2-thienyl | Me |
| 61 | Zr | Cl | Me$_2$Si | Me | Cp | H | 5-Me-2-thienyl | Me |
| 62 | Zr | Cl | Me$_2$Si | Me | Me$_4$Cp | H | Ph | Me |
| 63 | Zr | Cl | Me$_2$Si | Me | Me$_4$Cp | H | 4-Me—Ph | Me |
| 64 | Zr | Cl | Me$_2$Si | Me | Me$_4$Cp | H | 4-$^i$Pr—Ph | Me |
| 65 | Zr | Cl | Me$_2$Si | Me | Me$_4$Cp | H | 4-$^t$Bu—Ph | Me |
| 66 | Zr | Cl | Me$_2$Si | Me | Me$_4$Cp | H | 4-Ph—Ph | Me |
| 67 | Zr | Cl | Me$_2$Si | Me | Me$_4$Cp | H | 2-furyl | Me |
| 68 | Zr | Cl | Me$_2$Si | Me | Me$_4$Cp | H | 5-Me-2-furyl | Me |
| 69 | Zr | Cl | Me$_2$Si | Me | Me$_4$Cp | H | 5-$^t$Bu-2-furyl | Me |
| 70 | Zr | Cl | Me$_2$Si | Me | Me$_4$Cp | H | 5-trimethylsilyl-2-furyl | Me |
| 71 | Zr | Cl | Me$_2$Si | Me | Me$_4$Cp | H | 4,5-Me2-2-furyl | Me |
| 72 | Zr | Cl | Me$_2$Si | Me | Me$_4$Cp | H | 2-benofuryl | Me |
| 73 | Zr | Cl | Me$_2$Si | Me | Me$_4$Cp | H | 2-thienyl | Me |
| 74 | Zr | Cl | Me$_2$Si | Me | Me$_4$Cp | H | 5-Me-2-thienyl | Me |

TABLE 3

| Number | M | X$^1$, X$^2$ | R$^1$R$^2$Q | R$^9$ | R$^5$R$^6$R$^7$R$^8$Cp | R$^{10}$ | R$^{11}$ | R$^{12}$ |
|---|---|---|---|---|---|---|---|---|
| 75 | Zr | Cl | Me$_2$Si | H | Cp | H | Ph | H |
| 76 | Zr | Cl | Me$_2$Si | H | Cp | H | 4-Me—Ph | H |
| 77 | Zr | Cl | Me$_2$Si | H | Cp | H | 4-$^i$Pr—Ph | H |
| 78 | Zr | Cl | Me$_2$Si | H | Cp | H | 4-$^t$Bu—Ph | H |
| 79 | Zr | Cl | Me$_2$Si | H | Cp | H | 4-Ph—Ph | H |
| 80 | Zr | Cl | Me$_2$Si | H | Cp | H | 4-MeO—Ph | H |
| 81 | Zr | Cl | Me$_2$Si | H | Cp | H | 4-PhO—Ph | H |
| 82 | Zr | Cl | Me$_2$Si | H | Cp | H | 4-F—Ph | H |
| 83 | Zr | Cl | Me$_2$Si | H | Cp | H | 4-Cl—Ph | H |
| 84 | Zr | Cl | Me$_2$Si | H | Cp | H | 4-CF$_3$—Ph | H |
| 85 | Zr | Cl | Me$_2$Si | H | Cp | H | 2,6-Me$_2$—Ph | H |
| 86 | Zr | Cl | Me$_2$Si | H | Cp | H | 2,5-Me$_2$—Ph | H |
| 87 | Zr | Cl | Me$_2$Si | H | Cp | H | 3,5-Me$_2$—Ph | H |
| 88 | Zr | Cl | Me$_2$Si | H | Cp | H | 3,5-$^i$Pr$_2$—Ph | H |
| 89 | Zr | Cl | Me$_2$Si | H | Cp | H | 3,5-$^t$Bu$_2$—Ph | H |
| 90 | Zr | Cl | Me$_2$Si | H | Cp | H | 3,5-(MeO)$_2$—Ph | H |
| 91 | Zr | Cl | Me$_2$Si | H | Cp | H | 3,5-F$_2$—Ph | H |
| 92 | Zr | Cl | Me$_2$Si | H | Cp | H | 3,5-Cl$_2$—Ph | H |
| 93 | Zr | Cl | Me$_2$Si | H | Cp | H | 2,4,6-Me$_3$—Ph | H |
| 94 | Zr | Cl | Me$_2$Si | H | Cp | H | 2,4,6-F$_3$—Ph | H |
| 95 | Zr | Cl | Me$_2$Si | H | Cp | H | 3,4,5-F$_3$—Ph | H |

TABLE 3-continued

| Number | M | $X^1, X^2$ | $R^1R^2Q$ | $R^9$ | $R^5R^6R^7R^8Cp$ | $R^{10}$ | $R^{11}$ | $R^{12}$ |
|---|---|---|---|---|---|---|---|---|
| 96 | Zr | Cl | Me$_2$Si | H | Cp | H | 2,3,5,6-Me$_4$—Ph | H |
| 97 | Zr | Cl | Me$_2$Si | H | Cp | H | 2,3,5,6-F$_4$—Ph | H |
| 98 | Zr | Cl | Me$_2$Si | H | Cp | H | 2,3,4,5,6-Me$_5$—Ph | H |
| 99 | Zr | Cl | Me$_2$Si | H | Cp | H | 2,3,4,5,6-F$_5$—Ph | H |
| 100 | Zr | Br | Me$_2$Si | H | Cp | H | Ph | H |
| 101 | Zr | Me | Me$_2$Si | H | Cp | H | Ph | H |
| 102 | Zr | NMe$_2$ | Me$_2$Si | H | Cp | H | Ph | H |
| 103 | Zr | OCH$_3$ | Me$_2$Si | H | Cp | H | Ph | H |
| 104 | Zr | OEt | Me$_2$Si | H | Cp | H | Ph | H |
| 105 | Zr | O$^t$Bu | Me$_2$Si | H | Cp | H | Ph | H |
| 106 | Zr | OPh | Me$_2$Si | H | Cp | H | Ph | H |
| 107 | Zr | Cl | Et$_2$Si | H | Cp | H | Ph | H |
| 108 | Zr | Cl | Ph$_2$Si | H | Cp | H | Ph | H |
| 109 | Zr | Cl | Silacyclo-butylene | H | Cp | H | Ph | H |
| 110 | Zr | Cl | Me$_2$Si | H | Cp | H | 2-furyl | H |
| 111 | Zr | Cl | Me$_2$Si | H | Cp | H | 5-Me-2-furyl | H |
| 112 | Zr | Cl | Me$_2$Si | H | Cp | H | 5-$^n$Pr-2-furyl | H |
| 113 | Zr | Cl | Me$_2$Si | H | Cp | H | 5-$^i$Pr-2-furyl | H |
| 114 | Zr | Cl | Me$_2$Si | H | Cp | H | 5-$^n$Bu-2-furyl | H |
| 115 | Zr | Cl | Me$_2$Si | H | Cp | H | 5-$^i$Bu-2-furyl | H |
| 116 | Zr | Cl | Me$_2$Si | H | Cp | H | 5-$^t$Bu-2-furyl | H |
| 117 | Zr | Cl | Me$_2$Si | H | Cp | H | 5-trimethylsilyl-2-furyl | H |
| 118 | Zr | Cl | Me$_2$Si | H | Cp | H | 5-triethylsilyl-2-furyl | H |
| 119 | Zr | Cl | Me$_2$Si | H | Cp | H | 5-Ph-2-furyl | H |
| 120 | Zr | Cl | Me$_2$Si | H | Cp | H | 5-tolyl-2-furyl | H |

TABLE 4

| Number | M | $X^1, X^2$ | $R^1R^2Q$ | $R^9$ | $R^5R^6R^7R^8Cp$ | $R^{10}$ | $R^{11}$ | $R^{12}$ |
|---|---|---|---|---|---|---|---|---|
| 121 | Zr | Cl | Me$_2$Si | H | Cp | H | 5-fluorophenyl-2-furyl | H |
| 122 | Zr | Cl | Me$_2$Si | H | Cp | H | 5-chlorophenyl-2-furyl | H |
| 123 | Zr | Cl | Me$_2$Si | H | Cp | H | 4,5-Me$_2$-2-furyl | H |
| 124 | Zr | Cl | Me$_2$Si | H | Cp | H | 2-benzofuryl | H |
| 125 | Zr | Cl | Me$_2$Si | H | Cp | H | 2-thienyl | H |
| 126 | Zr | Cl | Me$_2$Si | H | Cp | H | 5-Me-2-thienyl | H |
| 127 | Zr | Cl | Me$_2$Si | H | Me$_4$Cp | H | Ph | H |
| 128 | Zr | Cl | Me$_2$Si | H | Me$_4$Cp | H | 4-Me—Ph | H |
| 129 | Zr | Cl | Me$_2$Si | H | Me$_4$Cp | H | 4-$^i$Pr—Ph | H |
| 130 | Zr | Cl | Me$_2$Si | H | Me$_4$Cp | H | 4-$^t$Bu—Ph | H |
| 131 | Zr | Cl | Me$_2$Si | H | Me$_4$Cp | H | 4-Ph—Ph | H |
| 132 | Zr | Cl | Me$_2$Si | H | Me$_4$Cp | H | 2-furyl | H |
| 133 | Zr | Cl | Me$_2$Si | H | Me$_4$Cp | H | 5-Me-2-furyl | H |
| 134 | Zr | Cl | Me$_2$Si | H | Me$_4$Cp | H | 5-$^t$Bu-2-furyl | H |
| 135 | Zr | Cl | Me$_2$Si | H | Me$_4$Cp | H | 5-trimethylsilyl-2-furyl | H |
| 136 | Zr | Cl | Me$_2$Si | H | Me$_4$Cp | H | 4,5-Me$_2$-2-furyl | H |
| 137 | Zr | Cl | Me$_2$Si | H | Me$_4$Cp | H | 2-benzofuryl | H |
| 138 | Zr | Cl | Me$_2$Si | H | Me$_4$Cp | H | 2-thienyl | H |
| 139 | Zr | Cl | Me$_2$Si | H | Me$_4$Cp | H | 5-Me-2-thienyl | H |
| 140 | Zr | Cl | Me$_2$Si | H | Cp | Me | Ph | H |
| 141 | Zr | Cl | Me$_2$Si | H | Cp | Me | 4-Me—Ph | H |
| 142 | Zr | Cl | Me$_2$Si | H | Cp | Me | 4-$^i$Pr—Ph | H |
| 143 | Zr | Cl | Me$_2$Si | H | Cp | Me | 4-$^t$Bu—Ph | H |
| 144 | Zr | Cl | Me$_2$Si | H | Cp | Me | 4-Ph—Ph | H |
| 145 | Zr | Cl | Me$_2$Si | H | Cp | Me | 4-MeO—Ph | H |
| 146 | Zr | Cl | Me$_2$Si | H | Cp | Me | 4-PhO—Ph | H |
| 147 | Zr | Cl | Me$_2$Si | H | Cp | Me | 4-F—Ph | H |
| 148 | Zr | Cl | Me$_2$Si | H | Cp | Me | 4-Cl—Ph | H |
| 149 | Zr | Cl | Me$_2$Si | H | Cp | Me | 4-CF$_3$—H | |
| 150 | Zr | Cl | Me$_2$Si | H | Cp | Me | 2,6-Me$_2$—Ph | H |
| 151 | Zr | Cl | Me$_2$Si | H | Cp | Me | 2,5-Me$_2$—Ph | H |
| 152 | Zr | Cl | Me$_2$Si | H | Cp | Me | 3,5-Me$_2$—Ph | H |
| 153 | Zr | Cl | Me$_2$Si | H | Cp | Me | 3,5-$^i$Pr$_2$—Ph | H |
| 154 | Zr | Cl | Me$_2$Si | H | Cp | Me | 3,5-$^t$Bu$_2$—Ph | H |
| 155 | Zr | Cl | Me$_2$Si | H | Cp | Me | 3,5-(MeO)$_2$—Ph | H |
| 156 | Zr | Cl | Me$_2$Si | H | Cp | Me | 3,5-F$_2$—Ph | H |
| 157 | Zr | Cl | Me$_2$Si | H | Cp | Me | 3,5-Cl$_2$—Ph | H |
| 158 | Zr | Cl | Me$_2$Si | H | Cp | Me | 2,4,6-Me$_3$—Ph | H |
| 159 | Zr | Cl | Me$_2$Si | H | Cp | Me | 2,4,6-F$_3$—Ph | H |
| 160 | Zr | Cl | Me$_2$Si | H | Cp | Me | 3,4,5-F$_3$—Ph | H |

TABLE 5

| Number | M | X¹, X² | R¹R²Q | R⁹ | R⁵R⁶R⁷R⁸Cp | R¹⁰ | R¹¹ | R¹² |
|---|---|---|---|---|---|---|---|---|
| 161 | Zr | Cl | Me₂Si | H | Cp | Me | 2,3,5,6-Me₄—Ph | H |
| 162 | Zr | Cl | Me₂Si | H | Cp | Me | 2,3,5,6-F₄—Ph | H |
| 163 | Zr | Cl | Me₂Si | H | Cp | Me | 2,3,4,5,6-Me₅—Ph | H |
| 164 | Zr | Cl | Me₂Si | H | Cp | Me | 2,3,4,5,6-F₅—Ph | H |
| 165 | Zr | Cl | Et₂Si | H | Cp | Me | Ph | H |
| 166 | Zr | Cl | Ph₂Si | H | Cp | Me | Ph | H |
| 167 | Zr | Cl | Silacyclo-butylene | H | Cp | Me | Ph | H |
| 168 | Zr | Cl | Me₂Si | H | Cp | Me | 2-furyl | H |
| 169 | Zr | Cl | Me₂Si | H | Cp | Me | 5-Me-2-furyl | H |
| 170 | Zr | Cl | Me₂Si | H | Cp | Me | 5-ⁿPr-2-furyl | H |
| 171 | Zr | Cl | Me₂Si | H | Cp | Me | 5-ⁱPr-2-furyl | H |
| 172 | Zr | Cl | Me₂Si | H | Cp | Me | 5-ⁿBu-2-furyl | H |
| 173 | Zr | Cl | Me₂Si | H | Cp | Me | 5-ⁱBu-2-furyl | H |
| 174 | Zr | Cl | Me₂Si | H | Cp | Me | 5-ᵗBu-2-furyl | H |
| 175 | Zr | Cl | Me₂Si | H | Cp | Me | 5-trimethylsilyl-2-furyl | H |
| 176 | Zr | Cl | Me₂Si | H | Cp | Me | 5-triethylsilyl-2-furyl | H |
| 177 | Zr | Cl | Me₂Si | H | Cp | Me | 5-Ph-2-furyl | H |
| 178 | Zr | Cl | Me₂Si | H | Cp | Me | 5-tolyl-2-furyl | H |
| 179 | Zr | Cl | Me₂Si | H | Cp | Me | 5-fluorophenyl-2-furyl | H |
| 180 | Zr | Cl | Me₂Si | H | Cp | Me | 5-chlorophenyl-2-furyl | H |
| 181 | Zr | Cl | Me₂Si | H | Cp | Me | 4,5-Me₂-2-furyl | H |
| 182 | Zr | Cl | Me₂Si | H | Cp | Me | 2-benzofuryl | H |
| 183 | Zr | Cl | Me₂Si | H | Cp | Me | 2-thienyl | H |
| 184 | Zr | Cl | Me₂Si | H | Cp | Me | 5-Me-2-thienyl | H |
| 185 | Zr | Cl | Me₂Si | H | Me₄Cp | Me | Ph | H |
| 186 | Zr | Cl | Me₂Si | H | Me₄Cp | Me | 4-Me—Ph | H |
| 187 | Zr | Cl | Me₂Si | H | Me₄Cp | Me | 4-ⁱPr—Rh | H |
| 188 | Zr | Cl | Me₂Si | H | Me₄Cp | Me | 4-ᵗBu—Ph | H |
| 189 | Zr | Cl | Me₂Si | H | Me₄Cp | Me | 4-Ph—Ph | H |
| 190 | Zr | Cl | Me₂Si | H | Me₄Cp | Me | 2-furyl | H |
| 191 | Zr | Cl | Me₂Si | H | Me₄Cp | Me | 5-Me-2-furyl | H |
| 192 | Zr | Cl | Me₂Si | H | Me₄Cp | Me | 5-ᵗBu-2-furyl | H |
| 193 | Zr | Cl | Me₂Si | H | Me₄Cp | Me | 5-trimethylsilyl-2-furyl | H |
| 194 | Zr | Cl | Me₂Si | H | Me₄Cp | Me | 4,5-Me₂-2-furyl | H |
| 195 | Zr | Cl | Me₂Si | H | Me₄Cp | Me | 2-benzofuryl | H |
| 196 | Zr | Cl | Me₂Si | H | Me₄Cp | Me | 2-thienyl | H |
| 197 | Zr | Cl | Me₂Si | H | Me₄Cp | Me | 5-Me-2-thienyl | H |

Moreover, there may be mentioned compounds in which zirconium of the above-described compounds is replaced by titanium or hafnium, and the like, as preferred ones.

2. Synthetic Method of Metallocene Compounds

The metallocene compound of the present invention can be synthesized by any methods depending on the substituents or bonding modes. An example of representative synthetic routes is shown below.

[Chem 10]

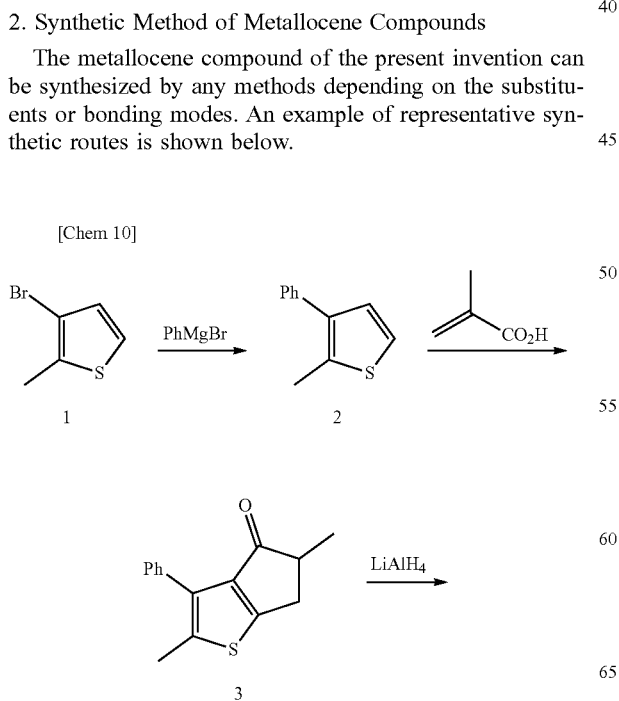

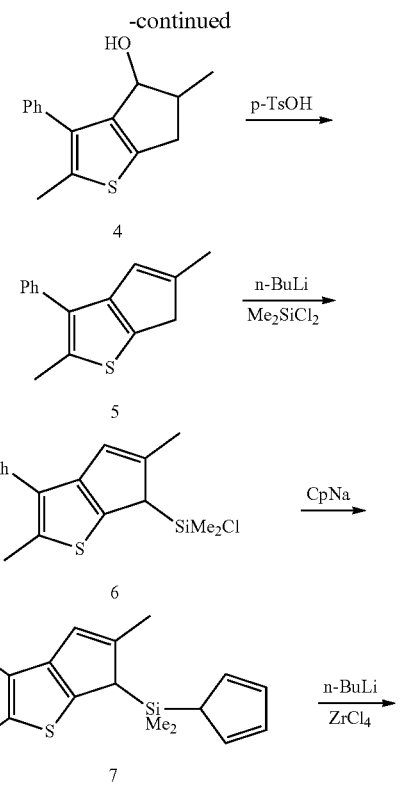

-continued

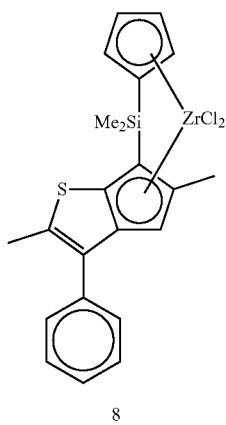

8

In the above synthetic route, 2 is obtained by subjecting 1 and phenylmagnesium bromide to a coupling reaction in the presence of a nickel catalyst. After 2 is reacted with methacrylic acid, the resulting 3 is reduced with lithium aluminum hydride and further dehydration is performed using p-toluenesulfonic acid to obtain a hydrocyclopentathiophene 5. After 5 is anionized with one equivalent of n-butyllithium or the like, the anion is reacted with an excess amount of dimethyldichlorosilane and unreacted dimethyldichlorosilane is removed by distillation to obtain 6. The resulting 6 is reacted with sodium cyclopentadienylide to obtain 7. After 7 is dianionized with two equivalents of n-butyllithium or the like, the dianion is reacted with zirconium tetrachloride to obtain 8.

As for the synthesis of the metallocene compound in which a substituent is introduced into the phenyl group at the 3-position of the cyclopentathiophene ring, the synthesis can be achieved by using a corresponding substituted raw material. By using a corresponding Grignard reagent such as 4-methylphenylmagnesium bromide, 4-i-propylphenylmagnesium bromide, or 4-t-butylphenylmagnesium bromide instead of phenylmagnesium bromide, a corresponding substituent can be introduced at the 3-position of the cyclopentathiophene ring.

Moreover, by using a corresponding reagent, for example, diethyldichlorosilane, diphenyldichlorosilane, or the like, instead of dimethyldichlorosilane to be reacted with 5, a corresponding bridging group structure can be introduced.

Furthermore, by using an anion of a corresponding substituted cyclopentadiene, for example, an anion of t-butylcyclopentadiene, 1,3-dimethylcyclopentadiene, 1-methyl-3-t-butylcyclopentadiene, or the like, instead of cyclopentadienyl, a complex in which a corresponding substituent is introduced into cyclopentadiene can be synthesized.

In addition, as for the synthesis of the metallocene compound in which each of various substituents is introduced at the 4-position of the cyclopentathiophene ring, 5 in which each of the various substituents is introduced at the 4-position of the cyclopentathiophene ring can be synthesized by reacting 3 with a Grignard reagent or an organolithium reagent that corresponds to each of the various substituents, instead of lithium aluminum hydride, and performing the dehydration reaction with p-toluenesulfonic acid.

3. Catalyst for Olefin Polymerization (1) individual Components

The metallocene compound of the present invention forms a catalyst component for olefin polymerization and the catalyst component can be used for a catalyst for olefin polymerization.

The catalyst for olefin polymerization of the present invention can contain known components in addition to the aforementioned metallocene compound of the present invention but preferably contains the following components (A), (B), and (C).

Component (A): the metallocene compound of the present invention

Component (B): a compound reacting with the metallocene compound of the component (A) to form a cationic metallocene compound, and Component (C): a fine particle carrier.

(2) Component (A)

The catalyst for olefin polymerization of the present invention uses the metallocene compound represented by any of the aforementioned general formulae (1) to (3) as an essential component (A), and it is also possible to use one or two or more compounds thereof.

(3) Component (B)

The catalyst for olefin polymerization of the present invention preferably contains, as a component (B), a compound reacting with the metallocene compound of the component (A) to form a cationic metallocene compound, in addition to the above component (A).

The component (B) is not particularly limited as long as it is a compound reacting with the component (A) to form a cationic metallocene compound, and known components may be used but there may be, for example, mentioned organoaluminum oxy compounds and borane compounds, borate compounds, and the like.

When an organoaluminum oxy compound is used as the component (B), the degree of strain hardening (λmax) of the resulting ethylene-based polymer becomes large and/or Mz/Mw (where Mz represents Z-average molecular weight measured by GPC and Mw represents weight-average molecular weight measured by GPC) that is a measure of the content of high-molecular-weight components increases, and thus the processability is more improved, so that the use is preferred.

When a borane compound or a borate compound is used as the component (B), the polymerization activity and copolymerizability become high, so that the productivity of the ethylene-based polymer having long-chain branches is improved.

Moreover, as the component (B), it is also possible to use a mixture of the above organoaluminum oxy compound and the above borane compound or borate compound. Furthermore, the borane compound and borate compound may be also used in combinations of two or more thereof.

The following will describe these individual compounds in further detail.

(i) Organoaluminum Oxy Compound

The organoaluminuin oxy compound has an Al—O—Al bond in the molecule, and the number of the bonds is in the range of usually 1 to 100, preferably 1 to 50. Such an organoaluminum oxy compound is usually a product obtained by reacting an organoaluminum compound with water.

Of the organoaluminum oxy compounds, one obtained by reacting an alkylaluminum with water is usually referred to as an aluminoxane and can be suitably used as the component (B). Also, of the aluminoxanes, methylaluminoxane (including those essentially composed of methylaluminoxane (MAO)) is particularly suitable as the organoaluminum oxy compound.

Incidentally, as the organoaluminum oxy compound, two or more of the organoaluminum oxy compounds can also be used in combination, and a solution of the organoaluminum oxy compound dissolved or dispersed in an inert hydrocarbon solvent to be mentioned below may be used.

The reaction of the organoaluminum with water is usually carried out in an inert hydrocarbon (solvent). As the inert hydrocarbon, there can be used aliphatic hydrocarbons, alicyclic hydrocarbons, and aromatic hydrocarbons such as pentane, hexane, heptane, cyclohexane, methylcyclohexane, benzene, toluene, and xylene, but it is preferable to use an aliphatic hydrocarbon or an aromatic hydrocarbon.

As the organoaluminum compound to be used for preparing the organoaluminum oxy compound, any of compounds represented by the following general formula (I) can be used but preferably, a trialkylaluminum is used.

$$R^a_t AlX^a_{3-t} \quad (I)$$

wherein $R^a$ represents a hydrocarbon group having a carbon number of 1 to 18, preferably a carbon number of 1 to 12, such as an alkyl group, an alkenyl group, an aryl group, or an aralkyl group, $X^a$ represents a hydrogen atom or a halogen atom, and t represents an integer of $1 \leq t \leq 3$.

Examples of the alkyl group in the trialkylaluminum include a methyl group, an ethyl group, a propyl group, an isopropyl group, a butyl group, an isobutyl group, a pentyl group, a hexyl group, an octyl group, a decyl group, a dodecyl group, and the like but, of these, a methyl group is particularly preferred.

The above organoaluminum compounds may be also used in combinations of two or more thereof.

The reaction ratio of water to the organoaluminum compound (molar ratio of water/Al) is preferably 0.25/1 to 1.2/1, particularly preferably 0.5/1 to 1/1, and the reaction temperature is usually in the range of usually −70 to 100° C., preferably −20 to 20° C. The reaction time is selected from the range of usually 5 minutes to 24 hours, preferably 10 minutes to 5 hours. As the water required for the reaction, there may be utilized not only simple water but also crystal water contained in copper sulfate hydrate, aluminum sulfate hydrate, or the like and a component from which water may be formed in the reaction system.

(ii) Borane Compound

Moreover, examples of the borane compounds to be used as the component (B) include triphenylborane, tri(o-tolyl)borane, tri(p-tolyl)borane, tri(m-tolyl)borane, tri(o-fluorophenyl)borane, tris(p-fluorophenyl)borane, tris(m-fluorophenyl)borane, tris(2,5-difluorophenyl)borane, tris(3,5-difluorophenyl)borane, tris(4-trifluoromethylphenyl)borane, tris(3,5-ditrifluoromethylphenyl)borane, tris(2,6-ditrifluoromethylphenyl)borane, tris(pentafluorophenyl)borane, tris(perfluoronaphthyl)borane, tris(perfluorobiphenyl)borane, tris(perfluoroanthryl)borane, tris(perfluorobinaphthyl)borane, and the like.

Of these, tris(3,5-ditrifluoromethylphenyl)borane, tris(2,6-ditrifluoromethylphenyl)borane, tris(pentafluorophenyl)borane, tris(perfluoronaphthyl)borane, tris(perfluorobiphenyl)borane, tris(perfluoroanthryl)borane, and tris(perfluorobinaphthyl)borane are more preferred, and further preferably, tris(2,6-ditrifluoromethylphenyl)borane, tris(pentafluorophenyl)borane, tris(perfluoronaphthyl)borane, and tris(perfluorobiphenyl)borane are exemplified as preferred borane compounds.

(iii) Borate Compounds

Further, when the borate compounds to be used as the component (B) are specifically expressed, a first example is a compound represented by the following general formula (II).

$$[L^1\text{-}H]^+[BR^b R^c X^b X^c]^- \quad (II)$$

In the formula (II), $L^1$ is a neutral Lewis base, H is a hydrogen atom, $[L^1\text{-}H]$ is a Bronsted acid such as an ammonium, an anilinium, or a phosphonium. As the ammonium, there can be exemplified trialkyl-substituted ammoniums such as trimethylammonium, triethylammonium, tripropylammonium, tributylammonium, and tri(n-butyl)ammonium, and dialkylammoniums such as di(n-propyl)ammonium and dicyclohexylammonium.

In addition, as the anilinium, there can be exemplified N,N-dialkylaniliniums such as N,N-dimethylanilinium, N,N-diethylanilinium, and N,N-2,4,6-pentamethylanilinium. Furthermore, as the phosphonium, there may be mentioned triarylphosphoniums such as triphenylphosphonium, tributylphosphonium, tri(methylphenyl)phosphonium, and tri(dimethylphenyl)phosphonium, and trialkylphosphoniums.

Moreover, in the formula (II), $R^b$ and $R^c$ are each an aromatic or substituted aromatic hydrocarbon group containing 6 to 20, preferably 6 to 16 carbon atoms, which are the same or different from each other, and may be linked to each other with a bridging group. As the substituent of the substituted aromatic hydrocarbon group, preferred is an alkyl group represented by a methyl group, an ethyl group, a propyl group, or an isopropyl group, or a halogen atom such as fluorine, chlorine, bromine, or iodine. Furthermore, $X^b$ and $X^c$ are each independently a hydride group, a halide group, a hydrocarbon group containing 1 to 20 carbon atoms, or a substituted hydrocarbon group containing 1 to 20 carbon atoms, one or more hydrogen atoms of which are replaced with a halogen atom.

As specific examples of the compound represented by the above general formula (II), there can be exemplified tributylammonium tetra(pentafluorophenyl)borate, tributylammonium tetra(2,6-ditrifluoromethylphenyl)borate, tributylammonium tetra(3,5-ditrifluoromethylphenyl)borate, tributylammonium tetra(2,6-difluorophenyl)borate, tributylammonium tetra(perfluoronaphthyl)borate, dimethylanilinium tetra(pentafluorophenyl)borate, dimethylanilinium tetra(2,6-ditrifluoromethylphenyl)borate, dimethylanilinium tetra(3,5-ditrifluoromethylphenyl)borate, dimethylanilinium tetra(2,6-difluorophenyl)borate, dimethylanilinium tetra(perfluoronaphthyl)borate, triphenylphosphonium tetra(pentafluorophenyl)borate, triphenylphosphonium tetra(2,6-ditrifluoromethylphenyl)borate, triphenylphosphonium tetra(3,5-ditrifluoromethylphenyl)borate, triphenylphosphonium tetra(2,6-difluorophenyl)borate, triphenylphosphonium tetra(perfluoronaphthyl)borate, trimethylammonium tetra(2,6-ditrifluoromethylphenyl)borate, triethylammonium tetra(pentafluorophenyl)borate, triethylammonium tetra(2,6-ditrifluoromethylphenyl)borate, triethylammonium tetra(perfluoronaphthyl)borate, tripropylammonium tetra(pentafluorophenyl)borate, tripropylammonium tetra(2,6-ditrifluoromethylphenyl)borate, tripropylammonium tetra(perfluoronaphthyl)borate, di(1-propyl)ammonium tetra(pentafluorophenyl)borate, dicyclohexylammonium tetraphenylborate, and the like.

Of these, preferred are tributylammonium tetra(pentafluorophenyl)borate, tributylammonium tetra(2,6-ditrifluoromethylphenyl)borate, tributylammonium tetra(3,5-ditrifluoromethylphenyl)borate, tributylammonium tetra(perfluoronaphthyl)borate, dimethylanilinium tetra(pentafluorophenyl)borate, dimethylanilinium tetra(2,6-ditrifluoromethylphenyl)borate, dimethylanilinium tetra(3,5-ditrifluoromethylphenyl)borate, and dimethylanilinium tetra(perfluoronaphthyl)borate.

Further, a second example of the borate compound is represented by the following general formula (III).

  (III)

In the formula (III), as $L^2$, there may be mentioned a carbocation, a methyl cation, an ethyl cation, a propyl cation, an isopropyl cation, a butyl cation, an isobutyl cation, a tert-butyl cation, a pentyl cation, a tropinium cation, a benzyl cation, a trityl cation, a sodium cation, a proton, and the like. Further, $R^b$, $R^c$, $X^b$, and $X^c$ are the same as the definitions in the above general formula (II).

As specific examples of the above compound, there can be exemplified trityl tetraphenylborate, trityl tetra(o-tolyl)borate, trityl tetra(p-tolyl)borate, trityl tetra(m-tolyl)borate, trityl tetra(o-fluorophenyl)borate, trityl tetra(p-fluorophenyl)borate, trityl tetra(m-fluorophenyl)borate, trityl tetra(3,5-difluorophenyl)borate, trityl tetra(pentafluorophenyl)borate, trityl tetra(2,6 ditrifluoromethylphenyl)borate, trityl tetra(3,5-ditrifluoromethylphenyl)borate, trityl tetra(perfluoronaphthyl)borate, tropinium tetraphenylborate, tropinium tetra(o-tolyl)borate, tropinium tetra(p-tolyl)borate, tropinium tetra(m-tolyl)borate, tropinium tetra(o-fluorophenyl)borate, tropinium tetra(p-fluorophenyl)borate, tropinium tetra(m-fluorophenyl)borate, tropinium tetra(3,5-difluorophenyl)borate, tropinium tetra(pentafluorophenyl)borate, tropinium tetra(2,6-ditrifluoromethylphenyl)borate, tropinium tetra(3, 5-ditrifluoromethylphenyl)borate, tropinium tetra(perfluoronaphthyl)borate, $NaBPh_4$, $NaB(o-CH_3-Ph)_4$, $NaB(p-CH_3-Ph)_4$, $NaB(m-CH_3-Ph)_4$, $NaB(o-F-Ph)_4$, $NaB(p-F-Ph)_4$, $NaB(m-F-Ph)_4$, $NaB(3,5-F_2-Ph)_4$, $NaB(C_6F_5)_4$, $NaB(2,6-(CF_3)2-Ph)_4$, $NaB(3,5-(CF_3)_2-Ph)_4$, $NaB(C_{16}F_7)_4$, $HBPh_4 \cdot 2$ diethyl ether, $HB(3,5-F_2-Ph)_4 \cdot 2$ diethyl ether, $HB(C_6F_5)_4 \cdot 2$ diethyl ether, $HB(2,6-(CF_3)_2-Ph)_4 \cdot 2$ diethyl ether, $HB(3,5-(CF_3)_2-Ph)_4 \cdot 2$ diethyl ether, and $HB(C_{10}H_7)_4 \cdot 2$ diethyl ether.

Of these, preferred are trityl tetra(pentafluorophenyl)borate, trityl tetra(2,6-difluoromethylphenyl)borate, trityl tetra (3,5-ditrifluoromethylphenyl)borate, trityl tetra(perfluoronaphthyl)borate, tropinium tetra(pentafluorophenyl) borate, tropinium tetra(2,6-ditrifluoromethylphenyl)borate, tropinium tetra(3,5-ditrifluoromethylphenyl)borate, tropinium tetra(perfluoronaphthyl)borate, $NaB(C_6F_5)_4$, $NaB(2,6-(CF_3)_2-Ph)_4$, $NaB(3,5-(CF_3)_2-Ph)_4$, $NaB(C_{10}F_7)_4$ $HB(C_6F_5)_4 \cdot 2$ diethyl ether, $HB(2,6-(CF_3)_2-Ph)_4 \cdot 2$ diethyl ether, $HB(3,5-(CF_3)_2-Ph)_4 \cdot 2$ diethyl ether, and $HB(C_{10}H_7)_4 \cdot 2$ diethyl ether.

More preferably, of these, there may be mentioned trityl tetra(pentafluorophenyl)borate, trityl tetra(2,6-ditrifluoromethylphenyl)borate, tropinium tetra(pentafluorophenyl)borate, tropinium tetra(2,6-difluoromethylphenyl)borate, $NaB(C_6F_5)_4$, $NaB(2,6-(CF_3)_2-Ph)_4$, $HB(C_6F_5)_4 \cdot 2$ diethyl ether, $HB(2,6-(CF_3)_2-Ph)_4 \cdot 2$ diethyl ether, $HB(3,5-(CF_3)_2-Ph)_4 \cdot 2$ diethyl ether, and $HB(C_{10}H_7)_4 \cdot 2$ diethyl ether.

(4) Component (C)

As the fine particle carrier that is the component (C), the catalyst for olefin polymerization of the present invention preferably uses an inorganic carrier, a particulate polymer carrier, or a mixture thereof. As the inorganic carrier, a metal, a metal oxide, a metal chloride, a metal carbonate, a carbonaceous material, or a mixture thereof can be used.

As suitable metals that can be used as the inorganic carriers, for example, iron, aluminum, nickel, and the like may be mentioned.

Further, as the metal oxide, either single oxides or composite oxides of Groups 1 to 14 elements of the Periodic Table can be mentioned and, for example, there can be exemplified natural or synthetic various single oxides or composite oxides such as $SiO_2$, $Al_2O_3$, $MgO$, $CaO$, $B_2O_3$, $TiO_2$, $ZrO_2$, $Fe_2O_3$, $Al_2O_3 \cdot MgO$, $Al_2O_3 \cdot CaO$, $Al_2O_3 \cdot SiO_2$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$, $SiO_2 \cdot MgO$, and the like. Here, the above formula is not a molecular formula and only represents the composition, and the structure and catalyst component ratio of the composite oxide to be used in the present invention are not particularly limited. The metal oxide to be used in the invention may be one that has absorbed a small amount of moisture and also may be one that contains a small amount of impurities.

As the metal chloride, for example, a chloride of an alkali metal or an alkaline earth metal is preferred, and specifically, $MgCl_2$, $CaCl_2$, and the like are especially preferred. As the metal carbonate, a carbonate of an alkali metal or an alkaline earth metal is preferred, and specifically, magnesium carbonate, calcium carbonate, barium carbonate, and the like may be mentioned.

As the carbonaceous material, for example, carbon black, active carbon, and the like may be mentioned.

The above inorganic carriers can be all suitably used in the invention but particularly, the use of a metal oxide, silica, alumina, or the like is preferred.

These inorganic carriers are preferably used after calcined at usually 200° C. to 800° C., preferably 400° C. to 600° C. in the air or an inert gas such as nitrogen or argon to regulate the amount of surface hydroxyl groups to 0.8 mmol/g to 1.5 mmol/g. The properties of the inorganic carriers are not particularly limited but, usually, it is preferable to use an inorganic carrier having an average particle size of 5 μm to 200 μm, preferably 10 μm to 150 μm, an average pore size of 20 Å to 1000 Å, preferably 50 Å to 500 Å, a specific surface area of 150 $m^2$/g to 1000 $m^2$/g, preferably 200 $m^2$/g to 700 $m^2$/g, a pore volume of 0.3 $cm^3$/g to 2.5 $cm^3$/g, preferably 0.5 $cm^3$/g to 2.0 $cm^3$/g, and an apparent specific gravity of 0.20 g/$cm^3$ to 0.50 g/$cm^3$, preferably 0.25 g/$cm^3$ to 0.45 g/$cm^3$.

The above-described inorganic carrier can be, as a matter of course, used as it is but can be used after the carrier is brought into contact with an organoaluminum compound such as trimethylaluminum, triethylaluminum, triisobutylaluminum, trihexylaluminum, tripropylaluminum, tributylaluminum, trioctylaluminum, tridecylaluminum, or diisobutylaluminum hydride, or an organoaluminum oxy compound containing an Al—O—Al bond, as a pretreatment.

4. Preparation Method of Catalyst for Olefin Polymerization

The contact method of individual components at the time of obtaining the catalyst for olefin polymerization composed of the component (A) which is a metallocene compound that is an essential component of the method for producing the olefin-based polymer of the invention, the component (B) reacting with the component (A) to form a cationic metallocene compound, and the component (C) that is a fine particle carrier is not particularly limited and, for example, the following methods can be arbitrarily employed.

(I) After the component (A) and the component (B) are brought into contact with each other, the component (C) is brought into contact therewith.

(II) After the component (A) and the component (C) are brought into contact with each other, the component (B) is brought into contact therewith.

(III) After the component (B) and the component (C) are brought into contact with each other, the component (A) is brought into contact therewith.

Of these contact methods, the contact methods (I) and (III) are preferred, and the contact method (I) is most preferred. In any contact methods, there is usually employed a method of bringing the components into contact with one another in an inert atmosphere such as nitrogen or argon, generally in the presence of a liquid inert hydrocarbon, e.g., an aromatic hydrocarbon such as benzene, toluene, xylene, or ethylbenzene (usually a carbon number of 6 to 12) or an aliphatic or alicyclic hydrocarbon such as heptane, hexane, decane, dodecane, or cyclohexane (usually a carbon number of 5 to 12), under stirring or without stirring. This contact is preferably performed at a temperature of usually −100° C. to 200° C., preferably −50° C. to 100° C., further preferably 0° C. to 50° C., for 5 minutes to 50 hours, preferably 30 minutes to 24 hours, more preferably 30 minutes to 12 hours.

Further, as the solvent to be used at the time of the contact of the component (A), the component (B), and the component (C), as described above, there can be used both of an aromatic hydrocarbon solvent in which certain component(s) are soluble or sparingly soluble and an aliphatic or alicyclic hydrocarbon solvent in which certain component(s) are insoluble or sparingly soluble.

In the case of carrying out the contact reaction of the components stepwise, the solvent or the like used in the preceding step may be directly used as a solvent in the subsequent contact reaction without removing it. Alternatively, after the preceding contact reaction using a soluble solvent, a liquid inert hydrocarbon (e.g., an aliphatic hydrocarbon, an alicyclic hydrocarbon, or an aromatic hydrocarbon, such as pentane, hexane, decane, dodecane, cyclohexane, benzene, toluene, or xylene) in which certain component(s) are insoluble or sparingly soluble may be added thereto to recover a desired product as a solid matter or a part or all of the soluble solvent is once removed by a means such as drying to take out the desired product as a solid matter, and thereafter, the subsequent contact reaction of the desired product may be carried out using any of the above-described inert hydrocarbon solvents. In the present invention, the contact reaction of the components may be conducted plural times.

In the present invention, the use ratio of the component (A), the component (B), and the component (C) is not particularly limited, but is preferably in the following range.

In the case where an organoaluminum oxy compound is used as the component (B), the atomic ratio of aluminum in the organoaluminum oxy compound to the transition metal (M) in the component (A) that is the metallocene compound of the present invention (Al/M) is desirably in the range of usually 1 to 100,000, preferably 5 to 1,000, more preferably 50 to 200.

Moreover, in the case where a borane compound or a borate compound is used as the component (B), the atomic ratio of boron to the transition metal (M) in the component (A) that is the metallocene compound of the invention (B/M) is desirably in the range of usually 0.01 to 100, preferably 0.1 to 50, more preferably 0.2 to 10.

Furthermore, in the case where a mixture of an organoaluminum oxy compound and a borane compound or a borate compound is used as the component (B), for each compound in the mixture, it is desirable to select a use ratio of each of Al and B the same as described above separately relative to the transition metal (M) in the component (A) that is the metallocene compound of the invention.

The amount of the component (C) to be used, which is a fine particle carrier, is 1 g, per 0.0001 to 5 mmol, preferably per 0.001 to 0.5 mmol, more preferably per 0.01 to 0.1 mmol of the transition metal (M) in the component (A).

The component (A), the component (B), and the component (C) are brought into contact with one another by any of the contact methods (1) to (3), and thereafter, by removing the solvent, the catalyst for olefin polymerization can be obtained as a solid catalyst. The removal of the solvent is desirably performed under normal pressure or under reduced pressure, at 0 to 200° C., preferably at 20 to 150° C., for 1 minute to 50 hours, preferably for 10 minutes to 10 hours.

Incidentally, the catalyst for olefin polymerization of the present invention can be also obtained by the following method.

(IV) The component (A) and the component (C) are brought into contact with each other and the solvent is removed to form a solid catalyst component, which is brought into contact with the component (B) that is an organoaluminum oxy compound, a borane compound, a borate compound, or a mixture thereof under polymerization conditions.

(V) The component (B) that is an organoaluminum oxy compound, a borane compound, a borate compound, or a mixture thereof is brought into contact with the component (C) and the solvent is removed to form a solid catalyst component, which is brought into contact with the component (A) under polymerization conditions.

Also in the case of the above contact methods (IV) and (V), as the component ratio, the contact conditions, and the solvent removal conditions, the same conditions as described above can be used.

Further, as a component serving as both of the component (B) and the component (C), it is also possible to use a layered silicate. The layered silicate is a silicate compound having a crystal structure in which planes configured by an ionic bond and the like are stacked in parallel with a weak bonding force. Most layered silicates are naturally mainly produced as a main component of clay minerals, but these layered silicates are not particularly limited to naturally occurring ones and may be artificially synthesized ones.

Of these, smectite group, vermiculite group, and mica group such as montmorillonite, sauconite, beidellite, nontronite, saponite, hectorite, stevensite, bentonite, and taeniolite are preferable.

In general, natural products are often non-ion-exchangeable (non-swellable) and, in that case, in order to have a preferred ion exchangeability (or swellability), it is preferable to perform a treatment for imparting the ion exchangeability (or swellability). Among such treatments, particularly preferred include the following chemical treatments. Here, as the chemical treatments, there can be used both of a surface treatment in which impurities attached to the surface are removed and a treatment which influences the crystal structure and/or chemical composition of the layered silicate. Specifically, there may be mentioned (i) an acid treatment to be carried out using hydrochloric acid, sulfuric acid, or the like, (ii) an alkali treatment to be carried out using NaOH, KOH, $NH_3$, or the like, (iii) a salt treatment using a salt composed of a cation containing at least one atom selected from Groups 2 to 14 of the Periodic Table and at least one anion selected from the group consisting of halogen atoms and inorganic acid-derived anions, (iv) a treatment with an organic substance such as an alcohol, a hydrocarbon compound, formamide, or aniline, and the like. These treatments may be carried out singly or in combination of two or more thereof.

As for the layered silicate, at any time before, during, or after any steps, the particle properties can be regulated by grinding, granulating, sizing, fractionating, or the like. The method may be any purposive one. In particular, as for the granulation method, for example, there may be mentioned a spray granulation method, a rolling granulation method, a compression granulation method, a stirring granulation method, a briquetting method, a compacting method, an extrusion granulation method, a fluidized bed granulation method, an emulsifying granulation method, an in-liquid granulation method, and the like. Among the above, particularly preferred granulation methods are a spray granulation method, a rolling granulation method, and a compression granulation method.

The layered silicate described above can be, as a matter of course, used as it is, but the layered silicate can be used in combination with an organoaluminum compound such as trimethylaluminum, triethylaluminum, triisobutylaluminum, tripropylaluminum, tributylaluminum, trihexylaluminum, trioctylaluminum, tridecylaluminum, or diisobutylaluminum hydride or an organoaluminum oxy compound containing an Al—O—Al bond.

For supporting the component (A), which is an essential component of the method for producing the olefin-based polymer of the present invention, on the layered silicate, the component (A) and the layered silicate may be brought into contact with each other, or the component (A), the organoaluminum compound, and the layered silicate may be brought into contact with one another.

The contact method of the components is not particularly limited and, for example, the following method can be arbitrarily employed.

(VI) After the component (A) and the organoaluminum compound are brought into contact with each other, the resultant is brought into contact with the layered silicate carrier.

(VII) After the component (A) and the layered silicate carrier are brought into contact with each other, the resultant is brought into contact with the organoaluminum compound.

(VIII) After the organoaluminum compound and the layered silicate carrier are brought into contact with each other, the resultant is brought into contact with the component (A).

Of these contact methods, the contact methods (IV) and (VIII) are preferred. Even in any contact methods, there is usually employed a method of bringing the components into contact with one another in an inert atmosphere such as nitrogen or argon, generally in the presence of a liquid inert hydrocarbon, e.g., an aromatic hydrocarbon such as benzene, toluene, xylene, or ethylbenzene (usually a carbon number of 6 to 12) or an aliphatic or alicyclic hydrocarbon such as heptane, hexane, decane, dodecane, or cyclohexane (usually a carbon number of 5 to 12), under stirring or without stirring.

The use ratio of the component (A), the organoaluminum compound, and the layered silicate carrier is not particularly limited, but is preferably in the following range. The amount of the component (A) to be supported is 0.0001 mmol to 5 mmol, preferably 0.001 mmol to 0.5 mmol, and more preferably 0.01 to 0.1 mmol per 1 g of the layered silicate carrier. Further, the amount of Al to be supported in the case of using the organoaluminum compound is desirably in the range of 0.01 mol to 100 mol, preferably 0.1 to 50 mol, more preferably 0.2 mol to 10 mol.

For the method of supporting and solvent removal, the same conditions as in the case of the above inorganic carrier may be used. When the layered silicate is used as a component serving as both of the component (B) and the component (C), the resulting ethylene-based polymer has narrow molecular weight distribution. Furthermore, the polymerization activity is high and the productivity of the ethylene-based polymer having long-chain branches is improved. The thus obtained catalyst for olefin polymerization may be used after a preliminary polymerization of monomers is performed as needed.

5. Method for Producing Olefin-Based Polymer

The above-described catalyst for olefin polymerization can be used for olefin polymerization, particularly homopolymerization of ethylene or copolymerization of ethylene with an α-olefin.

In the method for producing the olefin-based polymer of the present invention, at least ethylene is preferably contained and it is preferred that the polymer is substantially an ethylene-based polymer including an ethylene homopolymer and a copolymer of ethylene and an α-olefin.

The α-olefins that are comonomers include those having a carbon number of 3 to 30, preferably 3 to 8, and specifically, there may be exemplified propylene, 1-butene, 1-hexene, 1-octene, 4-methyl-1-pentene, and the like. As for the α-olefins, two or more α-olefins can be also copolymerized with ethylene. The copolymerization may be any of alternating polymerization, random copolymerization, and block polymerization. In the case where ethylene is copolymerized with the other α-olefin, the amount of the other α-olefin can be arbitrarily selected from the range of 90% by mol or less of the total monomers but is generally selected from the range of 40% by mol or less, preferably 30% by mol or less, further preferably 10% by mol or less. As a matter of course, it is also possible to use a small amount of a comonomer other than ethylene and the α-olefins. In this case, there may be mentioned compounds having a polymerizable double bond, for example, styrenes such as styrene, 4-methylstyrene, and 4-dimethylaminostyrene, dienes such as 1,4-butadiene, 1,5-hexadiene, 1,4-hexadiene, and 1,7-octadiene, cyclic compounds such as norbornene and cyclopentene, oxygen-containing compounds such as hexenol, hexenoic acid, and methyl octenate, and the like.

In the present invention, the polymerization reaction can be carried out in the presence of the supported catalyst mentioned above, preferably by slurry polymerization or gas-phase polymerization. In the case of the slurry polymerization, ethylene and the like are polymerized in the presence or absence of an inert hydrocarbon solvent selected from aliphatic hydrocarbons such as isobutene, hexane, and heptane, aromatic hydrocarbons such as benzene, toluene, and xylene, alicyclic hydrocarbons such as cyclohexane and methylcyclohexane, in a state that oxygen, water, and the like are substantially absent. It is needless to say that a liquid monomer such as liquid ethylene or liquid propylene can be also used as a solvent. Moreover, in the case of the gas-phase polymerization, ethylene and the like are polymerized in a reactor into which gas flows of ethylene and a comonomer are introduced, allowed to pass, or recycled. In the present invention, further preferable polymerization is the gas-phase polymerization. As for polymerization conditions, the temperature is 0° C. to 250° C., preferably 20° C. to 110° C., and more preferably 60° C. to 100° C. and, when the temperature is 60° C. to 90° C., there is a tendency that a larger amount of the long-chain branches are introduced. Moreover, the pressure is in the range of normal pressure to 10 MPa, preferably normal pressure to 4 MPa, more preferably 0.5 MPa to 2 MPa. As the polymerization time, there is commonly employed 5 minutes to 10 hours, preferably 5 minutes to 5 hours.

The molecular weight of the produced polymer can be controlled to some extent by varying the polymerization conditions such as the polymerization temperature and the molar ratio of the catalyst, but the control of the molecular weight can be more effectively performed by the addition of hydrogen to the polymerization reaction system.

Further, even when a component for the purpose of water removal, a so-called scavenger, is added into the polymerization system, the polymerization can be carried out without any trouble. As such a scavenger, there are used organoaluminum compounds such as trimethylaluminum, triethylaluminum, and triisobutylaluminum, the above-described organoaluminum oxy compounds, modified organoaluminum compounds containing a branched alkyl, organozinc compounds such as diethylzinc and dibutylzinc, organomagnesium compounds such as diethylmagnesium, dibutylmagnesium, and ethylbutylmagnesium, Grignard compounds such as ethylmagnesium chloride and butylmagnesium chloride. Of these, preferred are triethylaluminum, triisobutylaluminum, and ethylbutylmagnesium, and particularly preferred is triethylaluminum. It can be also applied to a multistage polymerization method having two or more stages in which polymerization conditions such as hydrogen concentration, the amount of the monomer(s), polymerization pressure, and polymerization temperature are different from each other, without any trouble.

6. Physical Properties of Ethylene-Based Polymer

The olefin-based polymer, particularly ethylene-based polymer produced using the catalyst for olefin polymerization of the present invention is characterized in that sufficient number and length of long-chain branches are introduced and molding processability is more improved.

In general, a polyethylene is processed into industrial products by a shaping method via a melted state, such as film molding, blow molding, or foam molding. On this occasion, it is well known that elongation flowing properties greatly influence the easiness of molding. That is, a polyethylene having narrow molecular weight distribution and having no long-chain branches has low melt strength and hence exhibits poor moldability. On the other hand, a polyethylene having an ultrahigh molecular weight component or a long-chain branch component is excellent in molding processability.

It is realized that the ethylene-based polymer produced by the polymerization catalyst for olefin of the present invention has sufficient number and length of long-chin branches introduced therein and is excellent in moldings processability, from values of the branching index (g') at molecular weights of 100,000 and 1,000,000 measured by combining a GPC apparatus equipped with a differential refractometer (RI) and a viscosity detector (Viscometer) and a light scattering detector.

Incidentally, in the present Description, the values of the branching index (g) at molecular weights of 100,000 and 1,000,000 are referred to as "$g_a'$" and "$g_b'$", respectively.

Moreover, from the viewpoint of excellent molding processability and mechanical properties, the ethylene-based polymer of the present invention preferably has further the following characteristics.

(1) MFR

MFR (melt flow rate, 190° C., a load of 2.16 kg) of the ethylene-based polymer in the present invention is preferably 0.001 g/10 minutes to 1,000 g/10 minutes, more preferably 0.01 g/10 minutes to 100 g/10 minutes, further preferably 0.05 g/10 minutes to 50 g/10 minutes, and particularly preferably 0.1 g/10 minutes to 50 g/10 minutes.

Incidentally, MFR of the ethylene-based polymer is a value as measured in accordance with JIS K6760 (190° C., a load of 2.16 kg).

(2) Density

The density of the ethylene-based polymer in the present invention is preferably 0.85 g/cm$^3$ to 0.97 g/cm$^3$, more preferably 0.88 g/cm$^3$ to 0.95 g/cm$^3$, and further preferably 0.90 g/cm$^3$ to 0.94 g/cm$^3$.

Incidentally, the density of the ethylene-based polymer is a value as measured in accordance with JIS K7112.

(3) Mw/Mn

The molecular weight distribution (Mw/Mn) of the ethylene-based polymer in the present invention is preferably 2.0 to 10.0, more preferably 2.0 to 9.0, further preferably 2.5 to 8.0, and particularly preferably 2.5 to 7.5.

Incidentally, the molecular weight distribution (Mw/Mn) of the ethylene-based polymer is defined by the ratio (Mw/Mn) of weight-average molecular weight (Mw) to number-average molecular weight (Mn) and is a value as measured under the following conditions by a gel permeation chromatographic (GPC) method.

The conversion from the retention volume to the molecular weight is performed using a calibration curve prepared in advance with standard polystyrene. The standard polystyrenes used are all produced by Tosoh Corporation under the following brand names:

F380, F288, F128, F80, F40, F20, F10, F4, F1, A5000, A2500, A1000. A calibration curve is created by injecting 0.2 mL of a solution prepared by dissolving each standard polystyrene in ODCB (containing 0.5 mg/mL of BHT) to provide a concentration of 0.5 mg/mL. As the calibration curve, a cubic expression obtained by approximation according to the least square method is used. In the viscosity formula $[\eta]=K \times M^\alpha$ used for the conversion into the molecular weight, the following numerical values are used.

PS: $K=1.38 \times 10^{-4}$, $\alpha=0.7$

PE: $K=3.92 \times 10^{-4}$, $\alpha=0.733$

PP: $K=1.03 \times 10^{-4}$, $\alpha=0.78$

Incidentally, the measurement conditions of GPC are as follows.

Apparatus: GPC (ALC/GPC 1500) manufactured by WATERS Co.

Detector: MIRAN 1A IR detector manufactured by FOXBORO Co. (measurement wavelength: 3.42 μm)

Columns: AD806M/S (3 columns) manufactured by Showa Denko K.K.

Mobile phase solvent: o-dichlorobenzene

Measurement temperature: 140° C.

Flow rate: 1.0 ml/minute

Injection amount: 0.2 ml

Sample preparation: as for a sample, a 1 mg/mL solution is prepared using ODCB (containing 0.5 mg/mL of BHT) and dissolution is achieved at 140° C. with taking a time of about 1 hour. Incidentally, the baseline and section of the resulting chromatogram is taken as exemplified in FIG. 1.

(4) Branching Indices ($g_a'$ and $g_b'$)

In the ethylene-based polymer of the present invention, the branching index ($g_a'$) at a molecular weight of 100,000 is preferably 0.50 to 0.99, more preferably 0.50 to 0.94, further preferably 0.50 to 0.87, and still further preferably 0.55 to 0.80. In the case where the branching index ($g_a'$) falls within the above range, an ethylene-based polymer having an excellent balance between elongation viscosity behavior and melt fluidity is obtained.

In the ethylene-based polymer of the present invention, $g_b'$ is 0.30 to 0.75, preferably 0.30 to 0.68, more preferably 0.35 to 0.55, and further preferably 0.35 to 0.50. When the $g_b'$ value is larger than 0.75, there are cases not preferable due to insufficient molding processability of the ethylene-based polymer and deficient transparency thereof. When the $g_b'$ value is smaller than 0.30, the molding processability of the ethylene-based polymer is enhanced but impact strength of a molded body decreases or transparency deteriorates, so that there are cases not preferable.

Incidentally, the branching indices ($g_a'$ and $g_b'$) are values as measured by the following method.

(i) Branch Structure Analysis by GPC-VIS

As the GPC apparatus which is equipped with a differential refractometer (RI) and a viscosity detector (Viscometer), Alliance GPCV2000 of WATERS Co. was used. Moreover, as the light scattering detector, a multi-angle laser light scattering detector (MALLS) DAWN-E of Wyatt Technology Co. is used. The detectors are connected in the order of MALLS, RI, and Viscometer. The mobile phase solvent is 1,2,4-trichlorobenzene (an antioxidant Irganox1076 is added at a concentration of 0.5 mg/mL). The flow rate is 1 mL/minute. As the columns, two columns of GMHHR-H(S) HT of Tosoh Corporation are connected and used. The temperature at the sample injection port and at each detector is 140° C. The sample concentration is 1 mg/mL. The injection amount (sample loop volume) is 0.2175 mL. At the time of determining absolute molecular weight (M) and inertial square radius (Rg) obtained from MALLS and intrinsic viscosity ([η]) obtained from Viscometer, calculation is performed utilizing a data processing software ASTRA (version 4.73.04) attached to MALLS with reference to the following literatures.

REFERENCE LITERATURES

1. Developments in polymer characterization, vol. 4. Essex; Applied Science; 1984. Chapter 1.
2. Polymer, 45, 6495-6505 (2004)
3. Macromolecules, 33, 2424-2436 (2000)
4. Macromolecules, 33, 6945-6952 (2000)

(ii) Calculation of Branching Indices ($g_a'$ and $g_b'$)

The branching index ($g_a'$) is calculated as a ratio (ηbranch/ηlin) of the intrinsic viscosity (ηbranch) obtained by measuring a sample by the above Viscometer to the intrinsic viscosity (ηlin) obtained by separately measuring a linear polymer.

When a long-chain branch is introduced into a polymer molecule, an inertial radius decreases as compared with a linear polymer molecule having the same molecular weight. Since the intrinsic viscosity decreases when the inertial radius decreases, the ratio (ηbranch/ηlin) of the intrinsic viscosity (ηbranch) of a branched polymer to the intrinsic viscosity (ηlin) of a linear polymer having the same molecular weight decreases as the long-chain branches are introduced. Therefore, the case where the branching index ($g_a'$=ηbranch/ηlin) becomes a value smaller than 1 means that branches are introduced, and it is meant that the introduced long-chain branches increase as the value decreases.

Figure 2:
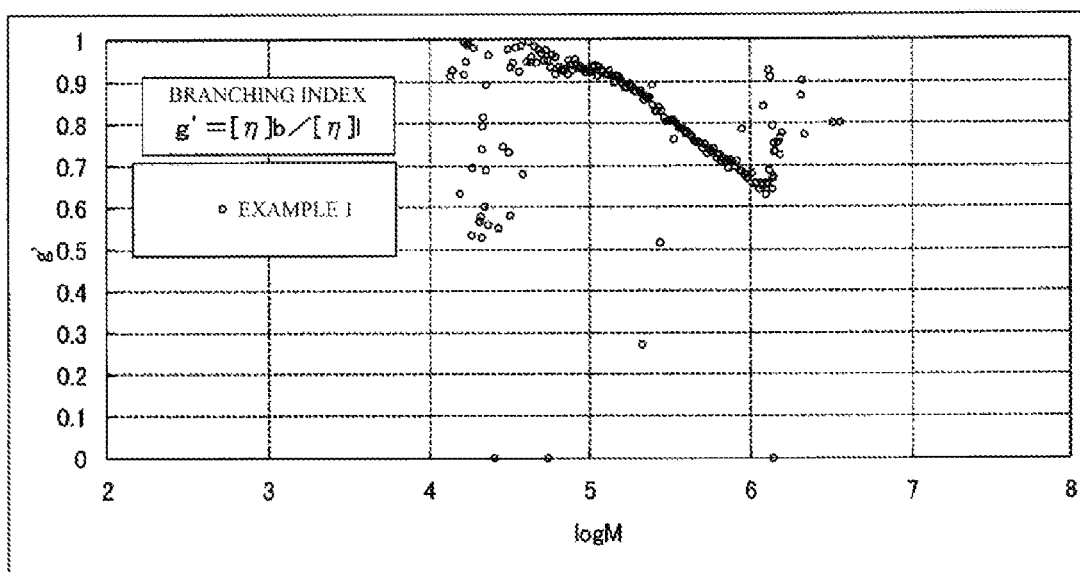
FIG. 2 is a graph showing a relation between a branching index (g') calculated from GPC-VIS measurement and molecular weight (M).

FIG. 2 shows an example of analysis results by the above GPC-VIS. FIG. 2 represents a branching index ($g_a'$) at a molecular weight (M). The g' value at log M=5 was taken as $g_a'$ and the g' value at log M=6 was taken as $g_b'$. Here, as the linear polymer, a linear polyethylene Standard Reference Material 1475a (National Institute of Standards & Technology) is used.

EXAMPLES

The present invention is specifically described below with reference to Examples but the invention should not be construed as being limited to these Examples. Incidentally, the evaluation methods used in Examples are as follows. All of the following catalyst synthesis steps and polymerization step were performed in a purified nitrogen atmosphere, and the solvents used were dehydrated and purified with molecular sieves 4 A.

1. Various Evaluation (Measurement) Methods (1) MFR

It was measured at 190° C. at a load of 2.16 kg in accordance with ES K6760. FR (flow rate ratio) was calculated from a ratio (=MFR10 kg/MFR) of MFR10 kg that is MFR similarly measured under the conditions of 190° C. and a load of 10 kg to MFR.

(2) Measurement of Molecular Weight Distribution (Mw/Mn)

It was measured by the method described in the article of "(3) Mw/Mn" of "6. Physical Properties of Ethylene-based Polymer" mentioned before.

(3) Measurement of Branching Index (g')

It was measured by the method described in the article of "(4) Branching Indices ($g_a'$ and $g_b'$)" of "6. Physical Properties of Ethylene-based Polymer" mentioned before.

2. Using Materials

Synthesis of Metallocene Compound (1) Synthesis of Metallocene Compound A: dimethylsilylene(2,5-dimethyl-3-phenyl-cyclopento[2,3-b]thiophene-6-yl)(cyclopentadienyl)zirconium Dichloride (1-1) Synthesis of 2,5-dimethyl-3-phenyl-6-hydrocyclopenta[1,2-b]thiophene Synthesis of 2,5dimethyl-3-phenyl-6-hydrocyclopenta[1,2-b]thiophene was conducted according to the procedure described in Experimental of J. Am. Chem. Soc. 2001, 123, 4763-4773.

(1-2) Synthesis of (2,5-dimethyl-3-phenyl-6-hydrocyclopenta[2,3-b]thiophen-6-yl)(cyclopentadienyl) dimethyl Silane After 3.48 g (15.38 mmol) of 2,5-dimethyl-3-phenyl-6-hydrocyclopenta[1,2-b]thiophene and 35 ml of THF were added to a 100 ml flask to form a solution, it was cooled to −78° C. and 7.38 ml (18.5 mmol) of an n-butyllithium/hexane solution (2.5M) was added thereto, followed by stirring at 10° C. for 3 hours. To a 100 ml flask prepared separately were added 3.97 g (30.76 mmol) of dimethyldichlorosilane and 20 ml of THE, and the whole was cooled to −78° C. and the previous reaction solution was added thereto. The whole was stirred at 10° C. for 12 hours. A yellow solution was obtained by removing volatile matter by distillation under reduced pressure. To the yellow solution was added 58.5 ml of thus forming a solution, and 8.08 ml (16.2 mmol) of a sodium cyclopentadienylide/THF solution (2M) was slowly added thereto at −30° C. The whole was stirred at 10° C. for 90 minutes. The reaction product was slowly added to 100 ml of ice water, extracted with 100 ml of ethyl acetate twice, the resulting organic phase was dried over anhydrous sodium sulfate. Sodium sulfate was filtered, the solution was subjected to removal by distillation under reduced pressure, and purification was performed through a silica gel column to obtain 2.97 g (yield 55%) of a yellow oil of (2,5-dimethyl-3-phenyl-6-hydrocyclopenta[2,3-b]thiophen-6-yl)(cyclopentadienyl)dimethyl silane.

(1-3) Synthesis of dimethylsilylene(2,5-dimethyl-3-phenyl-cyclopento[2,3-b]thiophen-6-yl)(cyclopentadienyl)zirconium Dichloride To a 200 ml flask were added 2.97 g (8.52 mmol) of (2,5-dimethyl-3-phenyl-6-hydrocyclopenta[2,3-b]thiophen-6-yl)(cyclopentadienyl)dimethyl silane and 30 ml of diethyl ether, followed by cooling to −78° C. Thereto was added dropwise 7.16 ml (17.9 mmol) of an n-butyllithium/n-hexane solution (2.5M), and the temperature was returned to room temperature, followed by stirring for 3 hours. The solvent of the reaction solution was removed by distillation under reduced pressure, 90 ml of dichloromethane was added thereto, and the whole was cooled to −78° C. Thereto was added 2.08 g (8.95 mmol) of zirconium tetrachloride, and the whole was stirred overnight while the temperature was returned to room temperature. The reaction solution was filtered and the solvent was removed by distillation from the filtrate under reduced pressure, thereby obtaining a yellow powder. The powder was washed with a mixed solvent of 18 ml of toluene and 6 ml of n-pentane to obtain 0.98 g (yield 22%) of yellow crystals of methylsilylene(2,5-dimethyl-3-phenyl-cyclopento[2,3-b]thiophen-6-yl)(cyclopentadienyl) zirconium dichloride.

$^1$H-NMR values (CDCl$_3$): δ 0.90 (s, 3H), δ 0.95 (s, 3H), δ 2.24 (s, 3H), δ 2.55 (s, 3H), δ 5.94 (t, 2H), δ 6.55 (s, 1H), δ 6.92 (m, 2H), δ 7.34 (m, 1H), δ 7.45 (t, 2H), δ 7.53 (m, 2H).

(2) Synthesis of Metallocene Compound B: dimethylsilylene(3-phenyl-cyclopento[2,3-b]thiophen-6-yl)(cyclopentadienyl)zirconium Dichloride (2-1) Synthesis of 4-phenylthiophene-2-carboxyaldehyde After 2.00 g (11.49 mmol) of 4-bromothiophene-2-carboxyaldehyde, 1.40 g (11.49 mmol) of phenylboronic acid, 2.44 g (22.98 mmol) of sodium carbonate, 15 ml of toluene, 15 ml of ethanol, and 5 ml of water were added to a 100 ml flask under nitrogen, 663.96 mg of Pd(PPh$_3$)$_4$ was added thereto and the whole was stirred at 100° C. for 6 hours. Extraction was performed with 100 ml of ethyl acetate twice and the resulting organic phase was washed with 50 ml of water and 50 ml of a saturated aqueous sodium chloride solution and dried over anhydrous sodium sulfate. Sodium sulfate was filtered, the solution was subjected to removal by distillation under reduced pressure, and purification was performed through a silica gel column to obtain 1.60 g (yield 81.3%) of a yellow solid of 4-phenylthiophene-2-carboxyaldehyde.

(2-2) Synthesis of 3-(4-phenyl-2-thienyl)-propionic Acid

Under nitrogen, 29.53 g (256.25 mmol) of triethylamine was added to a 300 ml flask and 30.78 g (640.64 mmol) of formic acid was slowly added thereto at 0° C. After the mixture was stirred at 25° C. for 1.5 hours, 15 ml of DMF was added thereto. Subsequently, a DMF (100 ml) solution of 16.16 g (112.11 mmol) of 2,2-dimethyl-1,3-dioxane-4,6-dione was added, and further, 20.10 g (106.77 mmol) of 4-phenylthiophene-2-carboxyaldehyde was added thereto at 25° C. When the mixture was stirred at 100° C. for 72 hours, it became a brown solution. The reaction solution was added to 150 ml of ice water and pH was adjusted to 1 with 15 ml of 6N hydrochloric acid, thereby precipitating a solid. The precipitated solid was collected by filtering and washed with 20 ml of water five times and with 100 ml of ethyl acetate twice to obtain 22.67 g (yield 91.40%) of a yellow solid of 3-(4-phenyl-2-thienyl)-propionic acid.

(2-3) Synthesis of 3-phenyl-cyclopenteno[2,3-b]thiophen-4-one

To a 100 ml flask was added 20.60 g (88.68 mmol) of 3-(4-phenyl-2-thienyl)-propionic acid, and 23.06 g (15.17 ml, 96.86 mmol) of the Eaton reagent was added thereto at 78 to 83° C. After the mixture was stirred at 80° C. for 1 hour, it was poured into 200 ml of ice water and extraction was performed with 200 ml of dichloromethane three times. The resulting organic phase was washed with 200 ml of an aqueous sodium carbonate solution and dried over anhydrous sodium sulfate. Sodium sulfate was filtered, the solution was subjected to removal by distillation under reduced pressure, and purification was performed through a silica gel column, thereby obtaining 8.20 g (yield 43.2%) of a pale yellow solid of 3-phenyl-cyclopenteno[2,3-b]thiophen-4-one.

(2-4) Synthesis of 3-phenyl-6-hydrocyclopenta[1,2-b]thiophene

Under nitrogen, 3.00 g (14.00 mmol) of 3-phenyl-cyclopenteno[2,3-b]thiophen-4-one and 50 ml of anhydrous THF were added to a 100 ml flask, and 425.04 mg (11.20 mmol) of lithium aluminum hydride was added thereto at 0° C. After the mixture was stirred at 20° C. for 1.5 hours, the reaction product was poured into 20 ml ice water and extracted with 50 ml of ethyl acetate three times. The resulting organic phase was washed with 50 ml of a saturated aqueous ammonium chloride solution twice and dried over anhydrous sodium sulfate. Sodium sulfate was filtered and the solution was subjected to removal by distillation under reduced pressure to obtain 2.85 g of a yellow solid.

Under nitrogen, 2.85 g of the above yellow solid and 150 ml of toluene were added to a 300 ml flask, and 25.06 mg (131.80 μmol) of p-toluenesulfonic acid monohydrate and 27.19 mg (131.80 μmol) of 2,6-di-t-butylphenol were added thereto. When the mixture was stirred at 110° C. for 2 hours, a pale yellow solution was obtained. The resulting pale yellow solution was poured into 50 ml of a saturated aqueous sodium hydrogen carbonate solution and the organic phase was separated. The aqueous phase was extracted with 30 ml of ethyl acetate three times, the resulting organic phase was mixed with the previous organic phase, and the mixed one was dried over anhydrous sodium sulfate. Sodium sulfate was filtered, the solution was subjected to removal by distillation under reduced pressure, and purification was performed through a silica gel column to obtain 1.15 g (yield 44.0%) of a pale yellow oil of 3-phenyl-6-hydrocyclopenta[1,2-b]thiophene.

(2-5) Synthesis of (3-phenyl-6-hydrocyclopenta[2,3-b]thiophen-6-yl)(cyclopentadienyl)dimethylsilane After 1.10 g (5.55 mmol) of 3-phenyl-6-hydrocyclopenta[1,2-b]thiophene and 30 ml of THF were added to a 100 ml flask under nitrogen to form a solution, it was cooled to −78° C. and 2.66 ml (6.65 mmol) of an n-butyllithium/hexane solution (2.5M) was added, followed by stirring at 10° C. for 3 hours. To a 100 ml flask prepared separately were added 1.43 g (11.10 mmol) of dimethyldichlorosilane and 10 ml of THF, and the whole was cooled to −78° C. and the previous reaction solution was added thereto. After the whole was stirred at 10° C. for 12 hours, 1.61 g of a pale yellow solid was obtained by removing volatile matter by distillation under reduced pressure. To the pale yellow solid was added 30 ml of THF, thus forming a solution, and 3.05 ml (6.1 mmol) of a sodium cyclopentadienylide/THF solution (2M) was added thereto at −30° C. The whole was stirred at 10° C. for 90 minutes. The reaction product was added to 20 ml of ice water and the organic phase was separated. The aqueous phase was extracted with 50 ml of ethyl acetate twice, the resulting organic phase was mixed with the previous organic phase, and the mixed one was dried over anhydrous sodium sulfate. Sodium sulfate was filtered, the solution was subjected to removal by distillation under reduced pressure, and purification was performed through a silica gel column to obtain 690 mg (yield 38.8%) of a pale yellow oil of (3-phenyl-6-hydrocyclopenta[2,3-b]thiophen-6-yl)(cyclopentadienyl)dimethylsilane.

(2-6) Synthesis of dimethylsilylene(3-phenyl-cyclopento[2,3-b]thiophen-6-yl)(cyclopentadienyl)zirconium Dichloride To a 200 ml flask were added 2.50 g (7.80 mmol) of (3-phenyl-6-hydrocyclopenta[2,3-b]thiophen-6-yl)(cyclopentadienyl)dimethylsilane and 50 ml of diethyl ether, followed by cooling to −78° C. Thereto was added dropwise 6.55 ml (16.4 mmol) of an n-butyllithium/n-hexane solution (2.5M), followed by stirring at 10° C. for 3 hours. The solvent of the reaction solution was removed by distillation under reduced pressure, 90 ml of dichloromethane was added thereto, and the whole was cooled to −78° C. Thereto was added 1.91 g (8.18 mmol) of zirconium tetrachloride, the temperature was raised to 10° C. over a period of 3 hours, and the whole was further stirred at 10° C. overnight. The reaction solution was filtered and the solvent was removed by distillation from the resulting filtrate under reduced pressure, thereby obtaining a yellow powder. The powder was washed with a mixed solvent of 11 ml of toluene and 4 ml of n-pentane and further extracted with 90 ml of dichloromethane to remove insoluble matter. The resulting dichloromethane solution was subjected to removal by distillation under reduced pressure, thereby obtaining 0.9 g (yield 24%) of yellow crystals of dimethylsilylene(3-phenyl-cyclopento[2,3-b]thiophen-6-yl)(cyclopentadienyl)zirconium dichloride.

$^1$H-NMR values (CDCl$_3$): δ 0.86 (s, 3H), δ 0.91 (s, 3H), δ 5.94 (m, 1H), δ 6.00 (m, 1H), δ 6.14 (m, 1H), δ 6.90 (m, 1H), δ 6.95 (m, 1H), δ 7.04 (d, 3H), δ 7.35 (t, 1H), δ 7.44 (t, 2H), δ 7.52 (d, 1H), δ 7.66 (d, 2H).

(3) Synthesis of Metallocene Compound C: dimethylsilylene(3-(5-methyl-2-phenyl)-cyclopento[2,3-b]thiophene-6-yl)(cyclopentadienyl)zirconium Dichloride (3-1) Synthesis of 4-bromothiophene-2-carboxyaldehyde Under nitrogen, 17.00 g (70.27 mmol) of 3,4-dibromothiophene and 35 ml of diethyl ether were added to a 300 ml flask, and 28.11 ml (70.28 mmol) of an n-butyllithium/n-hexane solution (2.5M) was slowly added dropwise at −78° C., followed by stirring still at −78° C. for 15 minutes. Subsequently, 5.14 g (70.27 mmol) of DMF was added thereto and the whole was stirred at −78° C. for 3 hours. The reaction solution was warmed to 15° C. and 40 ml of water was added thereto. Extraction was performed with 50 ml of ethyl acetate twice and the organic phase was dried over potassium carbonate. Potassium carbonate was filtered and the solution was subjected to removal by distillation under reduced pressure to obtain 15 g (purity about 80%) of a crude product of 4-bromothiophene-2-carboxyaldehyde.

(3-2) Synthesis of 3-(4-bromo-3-thienyl)-propionic acid

Under nitrogen, 7.54 g (157.02 mmol) of formic acid was added to a 300 ml flask, and 6.36 g (62.81 mmol) of triethylamine was slowly added thereto at 0° C. After the mixture was stirred at 20° C. for 1.5 hours, 50 ml of DMF was added thereto. Subsequently, a DMF (10 ml) solution of 3.96 g (27.48 mmol) of 2,2-dimethyl-1,3-dioxane-4,6-dione was added, and further, a DMF (10 ml) solution of 5.00 g (26.17 mmol) of 4-bromothiophene-2-carboxyaldehyde was added thereto at 20° C. When the mixture was stirred at 100° C. for 12 hours, it became a brown solution. The reaction solution was added to 100 ml of ice water and pH was adjusted to 12 with a 2N aqueous sodium hydroxide solution. Extraction was performed with 100 ml of dichloromethane twice and the aqueous layer was adjusted to pH 1 with 6N hydrochloric acid and again extracted with 100 ml of dichloromethane three times. The organic phase was dried over anhydrous sodium sulfate. Sodium sulfate was filtered and the solution was subjected to removal by distillation under reduced pressure to obtain 4.30 g of a crude product of 3-(4-bromo-3-thienyl)-propionic acid.

(3-3) Synthesis of 3-bromo-cyclopenteno[2,3-b]thiophen-6-one

To a 200 ml flask was added 111.38 g (73.28 ml, 467.89 mmol) of the Eaton reagent, and 11.00 g (46.79 mmol) of 3-(4-bromo-2-thienyl)-propionic acid was added thereto at 40° C. After the mixture was stirred at 40° C. for 30 minutes, it was poured into 200 ml of ice water and extraction was performed with 200 ml of dichloromethane four times. The resulting organic phase was washed with 200 ml of a saturated aqueous sodium hydrogen carbonate solution and dried over anhydrous sodium sulfate. Sodium sulfate was filtered, the solution was subjected to removal by distillation under reduced pressure, and purification was performed through a silica gel column to obtain 1.90 g (yield 18.7%) of a yellow solid of 3-bromo-cyclopenteno[2,3-b]thiophen-6-one.

(3-4) Synthesis of 3-(5-methyl-2-furyl)-cyclopenteno[2,3-b]thiophen-6-one

After 8.00 g (36.85 mmol) of 3-bromo-cyclopenteno[2,3-b]thiophen-6-one, 423.81 mg (737.00 μmol) of Pd(dba)$_2$, 773.29 mg (2.95 mmol) of triphenylphosphine, and 200 ml of toluene were added to a 500 ml flask under nitrogen, a toluene (40 ml) solution of 16.41 g of tri(n-butyl)(5-methyl-2-furyl)tin prepared separately was added thereto, followed by stirring at 110° C. for 16 hours. The reaction solution was diluted with 300 ml of ethyl acetate and the diluted solution was washed with 200 ml of a 5% aqueous potassium fluoride solution. After the organic phase was separated, the aqueous phase was extracted with 200 ml of ethyl acetate twice. The resulting organic phase was mixed with the previous organic phase and the mixed one was washed with 300 ml of a saturated aqueous sodium chloride solution and dried over anhydrous sodium sulfate. Sodium sulfate was filtered, the solution was subjected to removal by distillation under reduced pressure, purification was performed through a silica gel column, and further recrystallization was conducted from a mixed solvent of ethyl acetate/petroleum ether to obtain 7.04 g (yield 87.5%) of a yellow solid of 3-(5-methyl-2-furyl)-cyclopenteno[2,3-b]thiophen-6-one.

(3-5) Synthesis of 3-(5-methyl-2-furyl)-6-hydrocyclopenta[1,2-b]thiophene

Under nitrogen, 4.00 g (18.33 mmol) of 3-(5-methyl-2-furyl)-cyclopenteno[2,3-b]thiophen-6-one and 40 ml of ethanol were added to a 100 ml flask, and 3.58 g (19.25 mmol) of 4-methylbenzenesulfonohydrazide and 697.19 mg (3.67 mmol) of toluenesulfonic acid monohydrate were added thereto at 20° C. The mixture was stirred at 78° C. for 16 hours to obtain a yellow suspension. After cooling to 0° C., a yellow solid was recovered by filtering and washed with 10 ml of ethanol cooled to 0° C. three times, and then the yellow solid was dried under reduced pressure.

Under nitrogen, the obtained yellow solid and 300 ml of THF were added to a 500 ml flask, and 16.04 ml (40.1 mmol) of an n-butyllithium/n-hexane solution (2.5M) was added dropwise at −78° C., followed by stirring at 66° C. for 20 minutes. The reaction solution was poured into 200 ml of ice water and, after the organic phase was separated, the aqueous phase was extracted with 200 ml of ethyl acetate twice. The resulting organic phase was mixed with the previous organic phase and the mixed one was dried over anhydrous sodium sulfate. Sodium sulfate was filtered, the solution was subjected to removal by distillation under reduced pressure, and purification was performed through a silica gel column to obtain 2.27 g (yield 61.4%) of a yellow oil of 3-(5-methyl-2-furyl)-6-hydrocyclopenta[1,2-b]thiophene (3-6) Synthesis of (3-(5-methyl-2-furyl)-6-hydrocyclopenta[2,3-b]thiophen-6-yl)(cyclopentadienyl) dimethylsilane Under nitrogen, 1.00 g (4.94 mmol) of 3-(5-methyl-2-furyl)-6-hydrocyclopenta[1,2-b]thiophene and 20 ml of THF were added to a 100 ml flask, the whole was cooled to −78° C., and 2.37 ml (5.93 mmol) of an n-butyllithium/hexane solution (2.5M) was added, followed by stirring at 20° C. for 3 hours. Subsequently, 11.06 ml (7.41 mmol) of a cyclopentadienyldimethylsilyl chloride/hexane solution (0.67M) was slowly added thereto at −78° C., and the whole was stirred at 20° C. for 1.5 hours. The reaction solution was poured into 150 ml of ice water and extracted with 100 ml of ethyl acetate four times. The organic phase was washed with a saturated aqueous sodium chloride solution and dried over anhydrous sodium sulfate. Sodium sulfate was filtered, the solution was subjected to removal by distillation under reduced pressure, and purification was performed through a silica gel column to obtain 1.04 g (yield 64.9%) of a pale yellow oil of (3-(5-methyl-2-furyl)-6-hydrocyclopenta[2,3-b]thiophen-6-yl)(cyclopentadienyl)dimethylsilane.

(3-7) Synthesis of dimethylsilylene(3-(5-methyl-2-furyl)-cyclopento[2,3-b]thiophen-6-yl)(cyclopentadienyl)zirconium Dichloride Under nitrogen, 1.20 g (3.70 mmol) of (3-(5-methyl-2-furyl)-6-hydrocyclopenta[2,3-b]thiophen-6-yl)(cyclopenta-dienyl)dimethylsilane and 18 ml of diethyl ether were added to a 200 ml flask, followed by cooling to −78° C. Thereto was added dropwise 3.11 ml (7.78 mmol) of an n-butyllithium/n-hexane solution (2.5M), followed by stirring at 20° C. for 3 hours. The solvent of the reaction solution was removed by distillation under reduced pressure, 50 ml of dichloromethane was added thereto, and the whole was cooled to −78° C. Thereto was added 947.93 mg (4.07 mmol) of zirconium tetrachloride, the temperature was raised to 20° C. over a period of 3 hours, and the whole was further stirred at 20° C. overnight. The reaction solution was filtered and the solvent was removed by distillation from the resulting filtrate under reduced pressure, thereby obtaining a yellow powder. The powder was washed with a mixed solvent of 10 ml of toluene and 5 ml of n-pentane and further extracted with 50 ml of toluene to remove insoluble matter. The resulting toluene solution was subjected to removal by distillation under reduced pressure, thereby obtaining 270 mg (yield 15.1%) of a green solid of dimethylsilylene(3-(5-methyl-2-furyl)-cyclopento[2,3-b]thiophen-6-yl)(cyclopentadienyl)zirconium dichloride.

$^1$H-NMR values (CDCl$_3$): δ 0.85 (s, 3H), δ 0.89 (s, 3H), δ 2.36 (s, 3H), δ 5.92 (d, 1H), δ 5.99 (d, 1H), δ 6.07 (d, 1H), δ 6.13 (d, 1H), δ 6.50 (d, 1H), δ 6.87 (d, 1H), δ 6.93 (d, 1H), δ 7.00 (d, 1H), δ 7.56 (s, 1H).

(4) Synthesis of Metallocene Compound D: dimethylsilylene(3-phenyl-4-methyl-cyclopento[2,3-b]thiophene-6-yl)(cyclopentadienyl)zirconium Dichloride (4-1) Synthesis of 3-phenyl-4-methyl-6-hydrocyclopenta[1,2-b]thiophene Under nitrogen, 8.00 g (37.33 mmol) of 3-phenyl-cyclopenteno[2,3-b]thiophen-4-one obtained in (2-3) of (2) Synthesis of metallocene compound (B) and 100 ml of toluene were added to a 200 ml flask, and 18.67 ml (56.01 mmol) of methylmagnesium bromide (3M) was added thereto at 0° C., followed by stirring at 15° C. for 12 hours. The reaction solution was poured into 100 ml of ice water and the organic phase was separated and dried over anhydrous sodium sulfate. Sodium sulfate was filtered and the solution was subjected to removal by distillation under reduced pressure to obtain 8.3 g of a brown oil.

Under nitrogen, 5.00 g of the above brown oil and 500 ml of toluene were added to a 1000 ml flask, and 41.29 mg (217.1 μmol) of toluenesulfonic acid monohydrate and 44.79 mg (217.1 μmol) of 2,6-di-t-butylphenol were added thereto, followed by stirring at 110° C. for 1 hour. After cooling to room temperature, the reaction solution was poured into 100 ml of a saturated aqueous sodium hydrogen carbonate solution. The organic phase was separated, the aqueous phase was extracted with 100 ml of ethyl acetate three times, the resulting organic phase was mixed with the previous organic phase, and the mixed one was dried over anhydrous sodium sulfate. Purification was performed through a silica gel column to obtain 2.27 g (yield 61.4%) of a yellow oil of 3-(5-methyl-2-furyl)-6-hydrocyclopenta[1,2-b]thiophene. Sodium sulfate was filtered, the solution was subjected to removal by distillation under reduced pressure, and purification was performed through a silica gel column to obtain 1.80 g (yield 39.1%) of a yellow oil of 3-phenyl-4-methyl-6-hydrocyclopenta[1,2-b]thiophene.

(4-2) Synthesis of (3-phenyl-4-methyl-6-hydrocyclopenta[2,3-b]thiophen-6-yl)(cyclopentadienyl) dimethylsilane After 3.70 g (17.43 mmol) of 3-phenyl-4-methyl-6-hydrocyclopenta[1,2-b]thiophene and 50 ml of THF were added to a 100 ml flask under nitrogen to form a solution, it was cooled to −78° C. and 8.37 ml (20.9 mmol) of an n-butyllithium/hexane solution (2.5M) was added, followed by stirring at 10° C. for 3 hours. The whole was again cooled to −78° C. and 4.50 g (34.86 mmol) of dimethyldichlorosilane was quickly added, followed by stirring at 10° C. for 12 hours. By removing volatile matter by distillation under reduced pressure, 5.31 g of a pale yellow oil was obtained. To the pale yellow oil was added 60 ml of THF, thus forming a solution, and 9.14 ml (18.3 mmol) of a sodium cyclopentadienylide/THF solution (2M) was added thereto at −78° C. The whole was stirred at 10° C. for 2 hours, the reaction product was added to 50 ml of ice water, and the organic phase was separated. The aqueous phase was extracted with 100 ml of ethyl acetate twice, the resulting organic phase was mixed with the previous organic phase, and the mixed on was dried over anhydrous sodium sulfate. Sodium sulfate was filtered, the solution was subjected to removal by distillation under reduced pressure, and purification was performed through a silica gel column to obtain 2.20 g (yield 32.1%) of a pale yellow oil of (3-phenyl-4-methyl-6-hydrocyclopenta[2,3-b]thiophen-6-yl)(cyclopentadienyl)dimethylsilane.

(4-3) Synthesis of dimethylsilylene(3-phenyl-4-methyl-cyclopento[2,3-b]thiophen-6-yl)(cyclopentadienyl)zirconium Dichloride To a 200 ml flask were added 2.20 g (6.58 mmol) of (3-phenyl-4-methyl-6-hydrocyclopenta[2,3-b]thiophen-6-yl)(cyclopentadienyl)dimethylsilane and 50 ml of diethyl ether under nitrogen, followed by cooling to −78° C. Thereto was added dropwise 5.53 ml (13.8 mmol) of an n-butyllithium/n-hexane solution (2.5M), followed by stirring at 10° C. for 3 hours. The solvent of the reaction solution was removed by distillation under reduced pressure, 70 ml of dichloromethane was added thereto, and the whole was cooled to −78° C. Thereto was added 1.69 g (7.24 mmol) of zirconium tetrachloride, the temperature was raised to 10° C. over a period of 3 hours, and the whole was further stirred at 10° C. overnight. The reaction solution was filtered and the solvent was removed by distillation from the resulting filtrate under reduced pressure, thereby obtaining a yellow solid. The solid was washed with a mixed solvent of 11 ml of toluene and 4 ml of n-pentane and then dried under reduced pressure, thereby obtaining 1.40 g (yield 43.0%) of a pale green solid of dimethylsilylene(3-phenyl-4-methyl-cyclopento[2,3-b]thiophen-6-yl)(cyclopentadienyl)zirconium dichloride.

$^1$H-NMR values (CDCl$_3$): δ 0.80 (s, 3H), δ 0.90 (s, 3H), δ 2.17 (s, 3H), δ 5.62 (s, 1H), δ 5.81 (q, 1H), δ 5.94 (q, 1H), δ 6.95 (m, 1H), δ 7.01 (m, 1H), δ 7.28 (s, 1H), δ 7.36-7.40 (m, 3H), δ 7.49 (d, 2H).

(5) Synthesis of Metallocene Compound E: dimethylsilylene(3-(5-methyl-2-phenyl)-4-methyl-cyclopento[2,3-b]thiophene-6-yl)(cyclopentadienyl)zirconium Dichloride (5-1) Synthesis of 3-acetyl-4-bromothiophene Under nitrogen, 40.00 g (165.34 mmol) of 3,4-dibromothiophene and 200 ml of diethyl ether were added to a 500 ml flask, and 66.14 ml (165.4 mmol) of an n-butyllithium/n-hexane solution (2.5M) was slowly added dropwise thereto at −78° C., followed by stirring still at −78° C. for 30 minutes. Subsequently, 20.46 g (198.41 mmol) of N-methoxy-N-methyl-acetamide was added thereto at −78° C. and the whole was stirred at 20° C. for 12 hours. The reaction solution was adjusted to pH=7 with 2N hydrochloric acid and extracted with 100 ml of ethyl acetate three times. The organic phase was washed with 100 ml of water and dried over anhydrous sodium sulfate. Sodium sulfate was filtered, the solution was subjected to removal by distillation under reduced pressure, and purification was performed through a silica gel column to obtain 19.0 g (yield 56.0%) of a pale yellow oil of 3-acetyl-4-bromothiophene.

(5-2) Synthesis of ethyl 3-(4-bromo-3-thienyl)-3-hydroxybutyrate

Under nitrogen, 22.96 g (351.10 mmol) of zinc and 180 ml of THF were added to a 500 ml flask, and 3.18 g (29.26 mmol) of trimethylsilyl chloride was added thereto at 20° C., followed by stirring at 30 minutes. The mixture was heated to 40° C., 29.32 g (175.55 mmol) of ethyl bromoacetate was slowly added thereto, and the whole was stirred at 40° C. for 2 hours to obtain a brown suspension. Under nitrogen, 30.00 g (146.29 mmol) of 3-acetyl-4-bromothiophene and 80 ml of THF were added to a 500 ml flask prepared separately, and the previous brown suspension was slowly added thereto at 66° C., followed by stirring still at 66° C. for 6 hours. The reaction solution was poured into 400 ml of ice water and extracted with 200 ml of ethyl acetate twice. The organic phase was washed with 100 ml of water three times and dried over anhydrous sodium sulfate. Sodium sulfate was filtered and the solution was subjected to removal by distillation under reduced pressure to obtain 40.00 g of a brown oil of ethyl 3-(4-bromo-3-thienyl)-3-hydroxybutyrate.

(5-3) Synthesis of ethyl 3-(4-bromo-3-thienyl)-butyrate

Under nitrogen, 40.00 (136.43 mmol) of ethyl 3-(4-bromo-3-thienyl)-3-hydroxybutyrate, 19.04 g (163.72 mmol) of triethylsilane, and 308.02 g (2.70 mol) of trifluoroacetic acid were added to a 1000 ml flask, followed by stirring at 71° C. for 4 hours. The resulting solution was concentrated and the concentrate was dissolved in 500 ml of ethyl acetate, and the reaction solution was adjusted to pH=7 with an aqueous sodium carbonate solution. The organic layer was separated, washed with 100 ml of water three times, and dried over anhydrous sodium sulfate. Sodium sulfate was filtered and the solution was subjected to removal by distillation under reduced pressure to obtain 55.00 g of a brown oil of ethyl 3-(4-bromo-3-thienyl)-butyrate.

(5-4) Synthesis of 3-(4-bromo-3-thienyl)-butyric Acid

Under nitrogen, 50.00 g (180.39 mmol) of ethyl 3-(4-bromo-3-thienyl)-butyrate and 300 ml of ethanol were added to a 1000 ml flask, and 40.49 g (721.56 mmol) of potassium hydroxide was added thereto at 20° C., followed by stirring at 78° C. for 12 hours. The reaction solution was concentrated, 300 ml of water was added, and extraction with 100 ml of ethyl acetate was performed three times. The aqueous phase was adjusted to pH=3 with 6N hydrochloric acid and extracted with 200 ml of dichloromethane three times. The organic phase was dried over anhydrous sodium sulfate. Sodium sulfate was filtered and the solution was subjected to removal by distillation under reduced pressure to obtain 25.00 g of a brown oil of 3-(4-bromo-3-thienyl)-butyric acid.

(5-5) Synthesis of 3-bromo-4-methyl-cyclopenteno[2,3-b]thiophen-6-one

Under nitrogen, 30.00 g (120.42 mmol) of 3-(4-bromo-3-thienyl)-butyric acid was added to a 500 ml flask, and 246.00 g (2.07 mol) of thionyl chloride was added thereto at 20° C. The mixture was stirred at 76° C. for 3 hours and unreacted thionyl chloride was removed by distillation under reduced pressure. Subsequently, 200 ml of dichloromethane was added and 19.14 g (143.51 mmol) of aluminum chloride was added at 0° C., followed by stirring at 20° C. for 2 hours. The reaction solution was poured into 200 ml of ice water and extraction was performed with 200 ml of dichloromethane three times. The organic phase was washed with 100 ml of water three times and dried over anhydrous sodium sulfate. Sodium sulfate was filtered and the solution was subjected to removal by distillation under reduced pressure to obtain 24.50 g of a brown oil of 3-bromo-4-methyl-cyclopenteno[2,3-b]thiophen-6-one.

(5-6) Synthesis of 3-(5-methyl-2-furyl)-4-methyl-cyclopenteno[2,3-b]thiophen-6-one After 13.50 (58.41 mmol) of 3-bromo-4-methyl-cyclopenteno[2,3-b]thiophen-6-one, 671.77 mg (1.17 mmol) of Pd(dba)$_2$, 1.23 g (4.67 mmol) of triphenylphosphine, and 250 ml of toluene were added to a 500 ml flask under nitrogen, 26.02 g (70.10 mmol) of tri(n-butyl)(5-methyl-2-furyl)tin prepared separately was added thereto, followed by stirring at 110° C. for 12 hours. The reaction solution was poured into 400 ml of a 5% aqueous potassium fluoride solution and extraction with 200 ml of ethyl acetate was performed three times. After washing with 100 ml of water three times, the organic phase was dried over anhydrous sodium sulfate. Sodium sulfate was filtered, the solution was subjected to removal by distillation under reduced pressure, and purification was performed through a silica gel column to obtain 9.30 g (yield 68.54%) of a pale yellow oil of 3-(5-methyl-2-furyl)-4-methyl-cyclopenteno[2,3-b]thiophen-6-one.

(5-7) Synthesis of 3-(5-methyl-2-furyl)-4-methyl-6-hydrocyclopenta[1,2-b]thiophene Under nitrogen, 5.00 (21.52 mmol) of 3-(5-methyl-2-furyl)-4-methyl-cyclopenteno[2,3-b]thiophen-6-one and 40 ml of ethanol were added to a 100 ml flask, and 4.81 g (25.82 mmol) of 4-methylbenzenesulfonohydrazide and 1.02 g (5.38 mmol) of toluenesulfonic acid monohydrate were added thereto at 20° C. The mixture was stirred at 78° C. for 18 hours to obtain a yellow suspension. A yellow solid was recovered by filtering, washed with 10 ml of ethanol twice, and then dried under reduced pressure to obtain 4.6 g of the yellow solid. This reaction was carried out once more to obtain 6.8 g of the yellow solid in total.

Under nitrogen, 5.00 g of the obtained yellow solid and 60 ml of THF were added to a 200 ml flask, and 12.48 ml (31.20 mmol) of an n-butyllithium/n-hexane solution (2.5M) was added dropwise at −78° C., followed by stirring at 66° C. for 1 hour. The reaction solution was poured into 80 ml of ice water, extraction with 60 ml of ethyl acetate was performed three times, and the resulting organic phase was dried over anhydrous sodium sulfate. Sodium sulfate was filtered, the solution was subjected to removal by distillation under reduced pressure, and purification was performed through a silica gel column to obtain 1.60 g (yield 59.3%) of a yellow oil of 3-(5-methyl-2-furyl)-4-methyl-6-hydrocyclopenta[2,3-b]thiophene.

(5-8) Synthesis of (3-(5-methyl-2-furyl)-4-methyl-6-hydrocyclopenta[2,3-b]thiophen-6-yl)(cyclopentadienyl) Dimethylsilane Under nitrogen, 2.00 g (9.25 mmol) of 3-(5-methyl-2-furyl)-4-methyl-6-hydrocyclopenta[1,2-b]thiophene and 20 ml of THF were added to a 100 ml flask, the whole was cooled to −78° C., and 4.07 ml (10.18 mmol) of an n-butyllithium/hexane solution (2.5M) was added, followed by stirring at 20° C. for 3 hours. Subsequently, 15.19 ml (10.18 mmol) of a cyclopentadienyldimethylsilyl chloride/hexane solution (0.67M) was slowly added thereto at −78° C., and the whole was stirred at 20° C. for 1.5 hours. The reaction solution was poured into 150 ml of ice water and extracted with 100 ml of ethyl acetate four times. The organic phase was washed with a saturated aqueous sodium chloride solution and dried over anhydrous sodium sulfate. Sodium sulfate was filtered, the solution was subjected to removal by distillation under reduced pressure, and purification was performed through a silica gel column to obtain 1.46 g 46.6%) of a yellow oil of (3-(5-methyl-2-furyl)-4-methyl-6-hydrocyclopenta[2,3-b]thiophen-6-yl)(cyclopentadienyl) dimethylsilane.

(5-9) Synthesis of dimethylsilylene(3-(5-methyl-2-furyl)-4-methyl-cyclopento[2,3-b]thiophen-6-yl)(cyclopentadienyl)zirconium Dichloride Under nitrogen, 1.46 g (4.31 mmol) of (3-(5-methyl-2-furyl)-4-methyl-6-hydrocyclopenta[2,3-b]thiophen-6-yl)(cyclopentadienyl) dimethylsilane and 20 ml of diethyl ether were added to a 200 ml flask, followed by cooling to −78° C. Thereto was added dropwise 3.62 ml (9.05 mmol) of an n-butyllithium/n-hexane solution (2.5M), followed by stirring at 20° C. for 3 hours. The solvent of the reaction solution was removed by distillation under reduced pressure, 55 ml of dichloromethane was added thereto, and the whole was cooled to −78° C. Thereto was added 1.10 g (4.74 mmol) of zirconium tetrachloride, the temperature was raised to 20° C. over a period of 3 hours, and the whole was further stirred at 20° C. overnight. The reaction solution was filtered and the solvent was removed by distillation from the resulting filtrate under reduced pressure, thereby obtaining a brown powder. The powder was washed with a mixed solvent of 5 ml of toluene and 10 ml of n-pentane and further extracted with 100 ml of toluene to remove insoluble matter. The resulting toluene solution was subjected to removal by distillation under reduced pressure, thereby obtaining 207 mg (yield 9.67%) of a green solid of dimethylsilylene(3-(5-methyl-2-furyl)-4-methyl-cyclopento[2,3-b]thiophen-6-yl)(cyclopentadienyl)zirconium dichloride.

$^1$H-NMR values (CDCl$_3$): δ 0.80 (s, 3H), δ 0.89 (s, 3H), δ 2.35 (s, 3H), δ 2.49 (s, 3H), δ 5.65 (s, 1H), δ 5.81-5.83 (m, 1H), δ 5.91-5.93 (m, 1H), δ 6.03-6.05 (m, 1H), δ 6.45 (d, 1H), δ 6.91-6.94 (m, 1H), δ 6.96-6.99 (m, 1H), δ 7.47 (s, 1H).

(6) Synthesis of Metallocene Compound F: dimethylsilylene(3-(5-methyl-2-phenyl)-4-methyl-cyclopenta[2,3-b]thiophene-6-yl)(2,3,4,5-tetramethylcyclopentadienyl)zirconium Dichloride

(6-1) Synthesis of (3-(5-methyl-2-furyl)-4-methyl-6-hydrocyclopenta[2,3-b]thiophen-6-yl)(2,3,4,5-tetramethylcyclopentadienyl)dimethylsilane Under nitrogen, 2.50 g (11.56 mmol) of 3-(5-methyl-2-furyl)-4-methyl-6-hydrocyclopenta[1,2-b]thiophene obtained in (5-7) of (5) Synthesis of metallocene compound E and 40 ml of THF were added to a 100 ml flask, the whole was cooled to −78° C., and 5.78 ml (14.45 mmol) of an n-butyllithium/hexane solution (2.5M) was added, followed by stirring at 20° C. for 3 hours. Subsequently, 22.94 ml (15.37 mmol) of a cyclopentadienyldimethylsilyl chloride/hexane solution (0.67M) was slowly added thereto at −78° C., and the whole was stirred at 20° C. for 1.5 hours. The reaction solution was poured into 150 ml of ice water and extracted with 150 ml of ethyl acetate three times. The organic phase was washed with a saturated aqueous sodium chloride solution and dried over anhydrous sodium sulfate. Sodium sulfate was filtered, the solution was subjected to removal by distillation under reduced pressure, and purification was performed through a silica gel column to obtain 2.48 g (yield 54.4%) of a yellow oil of (3-(5-methyl-2-furyl)-4-methyl-6-hydrocyclopenta[2,3-b]thiophen-6-yl)(2,3,4,5-tetramethylcyclopentadienyl)dimethylsilane.

(6-2) Synthesis of dimethylsilylene(3-(5-methyl-2-furyl)-4-methyl-cyclopento[2,3-b]thiophen-6-yl)(2,3,4,5-tetramethylcyclopentadienyl)zirconium Dichloride Under nitrogen, 1.06 g (2.69 mmol) of (3-(5-methyl-2-furyl)-4-methyl-6-hydrocyclopenta[2,3-b]thiophen-6-yl)(2,3,4,5-tetramethylcyclopentadienyl)dimethylsilane and 20 ml of diethyl ether were added to a 100 ml flask, followed by cooling to −78° C. Thereto was added dropwise 2.64 ml (6.60 mmol) of an n-butyllithium/n-hexane solution (2.5M), followed by stirring at 20° C. for 3 hours. The solvent of the reaction solution was removed by distillation under reduced pressure, 40 ml of dichloromethane was added thereto, and the whole was cooled to −78° C. Thereto was added 689.57 mg (2.96 mmol) of zirconium tetrachloride, the temperature was raised to 20° C. over a period of 3 hours, and the whole was further stirred at 20° C. overnight. The reaction solution was filtered and the solvent was removed by distillation from the resulting filtrate under reduced pressure, thereby obtaining a yellow powder. The powder was washed with a mixed solvent of 15 ml of toluene and 25 ml of n-pentane and further extracted with 150 ml of toluene to remove insoluble matter. The resulting toluene solution was subjected to removal by distillation under reduced pressure, thereby obtaining 409 mg (yield 27.4%) of a yellow solid of dimethylsilylene(3-(5-methyl-2-furyl)-4-methyl-cyclopento[2,3-b]thiophen-6-yl)(2,3,4,5-tetramethylcyclopentadienyl)zirconium dichloride.

$^1$H-NMR values (CDCl$_3$): δ 0.90 (s, 3H), δ 1.02 (s, 3H), δ 1.93 (s, 3H), δ 2.00 (s, 3H), δ 2.05 (s, 3H), δ 2.08 (s, 3H), δ 2.35 (s, 3H), δ 2.48 (s, 3H), δ 5.33 (s, 1H), δ 6.02 (s, 1H), δ 6.39 (s, 1H), δ 7.44 (s, 1H).

(7) Synthesis of Metallocene Compound G: dimethylsilylene(2,5-dimethyl-cyclopento[2,3-b]thiophene-6-yl)(cyclopentadienyl)zirconium Dichloride

(7-1) Synthesis of 2,5-dimethyl-cyclopenteno[2,3-b]thiophen-4-one

To a 300 ml flask was added 152.04 g (638.69 mmol) of the Eaton reagent, and a mixture of 10.00 g (101.86 mmol) of 2-methylthiophene and 10.52 g (122.24 mmol) of methacrylic acid was added thereto at 78 to 83° C. over a period of 30 minutes. After the mixture was stirred at 80° C. for 5 minutes, it was gradually poured into 200 ml of ice water and extraction was performed with 300 ml of dichloromethane. The organic phase was separated and the aqueous phase was extracted with 300 ml of dichloromethane twice. The resulting organic phases were combined and the combined one was washed with 300 ml of a saturated aqueous sodium carbonate solution twice and dried over anhydrous sodium sulfate. Sodium sulfate was filtered, the solution was subjected to removal by distillation under reduced pressure, and purification was performed through a silica gel column to obtain 4.90 g (yield 28%) of a yellow liquid of 2,5-dimethyl-cyclopenteno[2,3-b]thiophen-4-one.

(7-2) Synthesis of 2,5-dimethyl-6-hydrocyclopenta[1,2-b]thiophene

Under nitrogen, 4.90 g (29.48 mmol) of 2,5-dimethyl-cyclopenteno[2,3-b]thiophen-4-one and 50 ml of anhydrous THF were added to a 100 ml flask, and 1.34 g (35.38 mmol) of lithium aluminum hydride was added thereto at 0° C. After the mixture was stirred at 15° C. for 2 hours, the reaction product was slowly poured into 100 ml of ice water and extracted with 300 ml of ethyl acetate twice. The resulting organic phase was dried over anhydrous sodium sulfate. Sodium sulfate was filtered and the solution was subjected to removal by distillation under reduced pressure to obtain 4.44 g of a yellow solid.

Under nitrogen, 780 mg of the above yellow solid and 15 ml of toluene were added to a 50 ml flask, and 44.13 mg (232.00 µmol) of p-toluenesulfonic acid monohydrate and 9.57 mg (46.40 µmol) of 2,6-di-t-butylphenol were added thereto. After the mixture was stirred at 110° C. for 10 minutes, the temperature was returned to room temperature and the mixture was washed with 50 ml of a saturated aqueous sodium carbonate solution and 50 ml of water, respectively. The resulting organic phase was dried over anhydrous sodium sulfate. Sodium sulfate was filtered, the solution was subjected to removal by distillation under reduced pressure, and purification was performed through a silica gel column to obtain 460.00 mg (yield 66%) of a yellow oil of 2,5-dimethyl-6-hydrocyclopenta[1,2-b]thiophene.

(7-3) Synthesis of (2,5-dimethyl-4-hydrocyclopenta[2,3-b]thiophen-4-yl)(cyclopentadienyl)dimethylsilane After 2.06 g (13.71 mmol) of 2,5-dimethyl-6-hydrocyclopenta[1,2-b]thiophene and 30 ml of THF were added to a 100 ml flask under nitrogen to form a solution, it was cooled to −78° C. and 6.58 ml (16.5 mmol) of an n-butyllithium/hexane solution (2.5M) was added, followed by stirring at 15° C. for 3 hours. To a 100 ml flask prepared separately were added 3.54 g (27.42 mmol) of dimethyldichlorosilane and 10 ml of THF, and the whole was cooled to −78° C. and the previous reaction solution was added thereto. After the whole was stirred at 10° C. for 12 hours, 3.33 g of a yellow oil was obtained by removing volatile matter by distillation under reduced pressure. To 2.57 g of the yellow oil was added 30 ml of THF, thus forming a solution, and 6.18 ml (12.4 mmol) of a sodium cyclopentadienylide/THF solution (2M) was added thereto at −78° C. The whole was stirred at 15° C. for 2 hours. The reaction product was added to 50 ml of ice water and the organic phase was separated. The aqueous phase was extracted with 100 ml of ethyl acetate twice, the resulting organic phase was mixed with the previous organic phase, and the mixed one was dried over anhydrous sodium sulfate. Sodium sulfate was filtered, the solution was subjected to removal by distillation under reduced pressure, and purification was performed through a silica gel column to obtain 1.76 g (yield 57.6%) of a yellow oil of (2,5-dimethyl-4-hydrocyclopenta[2,3-b]thiophen-4-yl)(cyclopentadienyl)dimethylsilane.

(7-4) Synthesis of dimethylsilylene(2,5-dimethyl-cyclopento[2,3-b]thiophen-4-yl)(cyclopentadienyl) zirconium Dichloride To a 2.00 ml flask were added 2.40 g (8.81 mmol) of (2,5-dimethyl-4-hydrocyclopenta[2,3-b]thiophen-4-yl)(cyclopentadienyl)dimethylsilane and 30 ml of diethyl ether under nitrogen, followed by cooling to −78° C. Thereto was added dropwise 7.40 ml (18.5 mmol) of an n-butyllithium/n-hexane solution (2.5M), followed by stirring at 15° C. for 3 hours.

The solvent of the reaction solution was removed by distillation under reduced pressure to obtain 2.50 g of a yellow solid. To 1.95 g (6.86 mmol) of the yellow solid was added 80 ml of dichloromethane, and the whole was cooled to −78° C. Thereto was added 1.68 g (7.20 mmol) of zirconium tetrachloride, the temperature was raised to 20° C. over a period of 3 hours, and the whole was further stirred at 20° C. overnight. The reaction solution was filtered and the solvent was removed by distillation from the resulting filtrate under reduced pressure, thereby obtaining a yellow powder. The powder was extracted with a mixed solvent of 34 ml of toluene and 11 ml of n-pentane to remove insoluble matter. The resulting solution was subjected to removal by distillation under reduced pressure, thereby obtaining a yellowish green solid. Further, the solid was extracted with 50 ml of dichloromethane and the resulting solution was subjected to removal by distillation under reduced pressure, thereby obtaining 0.92 g (yield 31%) of a yellowish green solid of dimethylsilylene(2,5-dimethyl-cyclopento[2,3-b]thiophen-4-yl)(cyclopentadienyl)zirconium dichloride.

$^1$H-NMR values (CDCl$_3$): δ 0.905 (s, 3H), δ 0.913 (s, 3H), δ 2.23 (s, 3H), δ 2.45 (s, 3H), δ 5.69 (m, 1H), δ 5.97 (m, 1H), δ 6.43 (s, 1H), δ 6.55 (s, 1H), δ 6.87 (m, 1H), δ 6.95 (m, 1H).

(8) Synthesis of Metallocene Compound H: dimethylsilylene(4-phenyl-indenyl-1-yl)(cyclopentadienyl) zirconium Dichloride As for the synthesis of dimethylsilylene(4-phenyl-indenyl-1-yl)(cyclopentadienyl)zirconium dichloride, it was synthesized according to the procedure described in Examples (Synthetic Example 5) of JP-A-2011-137146.

Example 1

(1) Preparation of Solid Catalyst

Under a nitrogen atmosphere, 5 g of silica calcined at 600° C. for 5 hours was placed in a 200 ml two-neck flask and was dried under reduced pressure for 1 hour by means of a vacuum pump while heating on an oil bath at 150° C. In a 100 ml two-neck flask prepared separately was placed 64 mg of the metallocene compound A under a nitrogen atmosphere, and the compound was dissolved in 13.4 ml of dehydrated toluene. At room temperature, 8.6 ml of a 20% methylaluminoxane/toluene solution manufactured by Albemarle Corporation was added to the toluene solution of the metallocene compound A, followed by stirring for 30 minutes. While the 200 ml two-neck flask containing vacuum-dried silica placed therein was heated and stirred on an oil bath at 40° C., all the amount of the toluene solution of the reaction product of the metallocene compound A and methylaluminoxane was added thereto. After the whole was stirred at 40° C. for 1 hour, the toluene solvent was removed by distillation still under heating at 40° C., thereby obtaining a solid catalyst.

(2) Production of Ethylene-1-Butene Copolymer

An ethylene-1-butene copolymer was produced using the solid catalyst obtained in (1) Preparation of Solid Catalyst of the above Example 1.

That is, after 500 ml of thoroughly dehydrated and deoxygenated heptane, 57 mg of triethylaluminum, and 34 ml of hydrogen at normal pressure were introduced into a stainless steel-made autoclave having stirring and temperature-controlling devices and an internal volume of 1 liter, the temperature was raised to 7.5° C. while stirring. Ethylene containing 1-butene in a ratio of 5% by mol relative to ethylene was introduced until partial pressure thereof reached 1.4 MPa, 10 ml of a heptane slurry of 0.100 g of the above solid catalyst was pressed therein with an argon gas, and polymerization was continued for 60 minutes while maintaining an ethylene partial pressure of 1.4 MPa and a temperature of 75° C.

As a result, 23.6 g of an ethylene-1-butene copolymer was formed. MFR of the resulting copolymer was 0.05 g/10 minutes. Polymerization conditions are summarized in Table 6 and Polymerization results are summarized in Table 7.

Example 2

An ethylene-1-butene copolymer was produced in the same manner as in Example 1 except that 0.100 g of the solid catalyst obtained in Example 1 was used and 68 ml of hydrogen was introduced at normal pressure before ethylene containing 10% by weight of 1-butene was introduced.

As a result, 25.2 g of an ethylene-1-butene copolymer was formed. MFR of the resulting copolymer was 0.35 g/10 minutes. Polymerization conditions are summarized in Table 6 and Polymerization results are summarized in Table 7.

TABLE 6

| | Catalyst | | | | | | Amount of solid catalyst (g) |
|---|---|---|---|---|---|---|---|
| | Component (A) | | Component (B) | | Component (C) | | |
| Example | Metallocene Compound | Amount (mmol) | Compound | Amount (mmol) | Compound | Amount (g) | |
| 1 | A | 0.00193 | MAO | 0.39 | silica | 0.077 | 0.100 |
| 2 | A | 0.00193 | MAO | 0.39 | silica | 0.077 | 0.100 |

| | Polymerization conditions | | | | | | |
|---|---|---|---|---|---|---|---|
| Example | TEA (mmol) | Solvent | Hydrogen H2/C2 (%) | Comonomer | Temperature (° C.) | C2 partial pressure (MPa) | Polymerization Time (minute) |
| 1 | 0.50 | heptane | 0.185 | C4/C2 = 5.0 mol % | 75 | 1.4 | 60 |
| 2 | 0.50 | heptane | 0.321 | C4/C2 = 5.0 mol % | 75 | 1.4 | 60 |

TABLE 7

| | Results | | | | | | | |
|---|---|---|---|---|---|---|---|---|
| | | Activity | MFR | | | | g' | |
| Example | Yield (g) | (g-PE/g-Cat/hr) | (g/10 minutes) | FR | Mw × 10$^4$ | Mw/Mn | $g_a'$ value | $g_b'$ value |
| 1 | 23.6 | 236 | 0.05 | 18.3 | 14.6 | 3.6 | 0.93 | 0.67 |
| 2 | 25.2 | 252 | 0.35 | 14.1 | 10.9 | 3.7 | 0.94 | 0.67 |

Example 3

An ethylene-1-butene copolymer was produced using the solid catalyst obtained in (1) Preparation of Solid Catalyst of the above Example 1.

That is, after 800 ml of thoroughly dehydrated and deoxygenated isobutane, 34 mg of triethylaluminum, 6483 ml of hydrogen diluted with nitrogen at a concentration of 5% at normal pressure, and 10 ml of 1-butene at 0.6 MPa were introduced into a stainless steel-made autoclave having stirring and temperature-controlling devices and an internal volume of 1.5 liters, the temperature was raised to 75° C. while stirring. Ethylene was introduced until partial pressure thereof reached 1.4 MPa, 0.093 g of the above solid catalyst was pressed therein with a nitrogen gas, and polymerization was continued for 60 minutes while maintaining an ethylene partial pressure of 1.4 MPa and a temperature of 75° C.

As a result, 108.0 g of an ethylene-1-butene copolymer was formed. MFR of the resulting copolymer was 0.20 g/10 minutes. Polymerization conditions are summarized in Table 8 and Polymerization results are summarized in Table 9.

Example 4

(1) Preparation of Solid Catalyst

A solid catalyst was prepared in the same manner as in (1) Preparation of Solid Catalyst of (Example 1) except that 60 mg of the metallocene compound B was used instead of the metallocene compound A.

(2) Production of Ethylene-1-Butene Copolymer

An ethylene-1-butene copolymer was produced using the solid catalyst obtained in (1) Preparation of Solid Catalyst of the above Example 4.

An ethylene-1-butene copolymer was produced in the same manner as in Example 3 except that 0.209 g of the solid catalyst obtained in (1) Preparation of Solid Catalyst of Example 4 was used, 30 ml of 1-butene was introduced at 0.6 MPa, and hydrogen was not introduced.

As a result, 53.3 g of an ethylene-1-butene copolymer was formed. MFR of the resulting copolymer was 3.55 g/10 minutes. Polymerization conditions are summarized in Table 8 and Polymerization results are summarized in Table 9.

Example 5

(1) Preparation of Solid Catalyst

A solid catalyst was prepared in the same manner as in (1) Preparation of Solid Catalyst of (Example 1) except that 61 mg of the metallocene compound C was used instead of the metallocene compound A.

(2) Production of Ethylene-1-Butene Copolymer

An ethylene-1-butene copolymer was produced using the solid catalyst obtained in (1) Preparation of Solid Catalyst of the above Example 5.

An ethylene-1-butene copolymer was produced in the same manner as in Example 3 except that 0.179 g of the solid catalyst obtained in (1) Preparation of Solid Catalyst of Example 5 was used, 30 ml of 1-butene was introduced at 0.6 MPa, and hydrogen was not introduced.

As a result, 30.4 g of an ethylene-1-butene copolymer was formed. MFR of the resulting copolymer was 2.11 g/10 minutes. Polymerization conditions are summarized in Table 8 and Polymerization results are summarized in Table 9.

Example 6

(1) Preparation of Solid Catalyst

A solid catalyst was prepared in the same manner as in (1) Preparation of Solid Catalyst of (Example 1) except that 62 mg of the metallocene compound D was used instead of the metallocene compound A.

(2) Production of Ethylene-1-Butene Copolymer

An ethylene-1-butene copolymer was produced using the solid catalyst obtained in (1) Preparation of Solid Catalyst of the above Example 6.

An ethylene-1-butene copolymer was produced in the same manner as in Example 3 except that 0.062 g of the solid catalyst obtained in (1) Preparation of Solid Catalyst of Example 6 was used, 70 ml of 1-butene was introduced at 0.6 MPa, and 540 ml of hydrogen diluted with nitrogen at a concentration of 5% was introduced at normal pressure.

As a result, 40.0 g of an ethylene-1-butene copolymer was formed. MFR of the resulting copolymer was 0.12 g/10 minutes. Polymerization conditions are summarized in Table 8 and Polymerization results are summarized in Table 9.

Example 7

(1) Preparation of Solid Catalyst

A solid catalyst was prepared in the same manner as in (1) Preparation of Solid Catalyst of (Example 1) except that 62 mg of the metallocene compound E was used instead of the metallocene compound A.

(2) Production of Ethylene-1-Butene Copolymer

An ethylene-1-butene copolymer was produced using the solid catalyst obtained in (1) Preparation of Solid Catalyst of the above Example 7.

An ethylene-1-butene copolymer was produced in the same manner as in Example 3 except that 0.069 g of the solid catalyst obtained in (1) Preparation of Solid Catalyst of Example 7 was used, 70 ml of 1-butene was introduced at 0.6 MPa, and 550 ml of hydrogen diluted with nitrogen at a concentration of 5% was introduced at normal pressure.

As a result, 5.6 g of an ethylene-1-butene copolymer was formed. MFR of the resulting copolymer was 0.24 g/10 minutes. Polymerization conditions are summarized in Table 8 and Polymerization results are summarized in Table 9.

Example 8

(1) Preparation of Solid Catalyst

A solid catalyst was prepared in the same manner as in (1) Preparation of Solid Catalyst of (Example) except that 69 mg of the metallocene compound F was used instead of the metallocene compound A.

(2) Production of Ethylene-1-Butene Copolymer

An ethylene-1-butene copolymer was produced using the solid catalyst obtained in (1) Preparation of Solid Catalyst of the above Example 8.

An ethylene-1-butene copolymer was produced in the same manner as in Example 3 except that 0.038 g of the solid catalyst obtained in Example 8 was used, 70 ml of 1-butene was introduced at 0.6 MPa, and 1958 ml of hydrogen diluted with nitrogen at a concentration of 5% was introduced at normal pressure.

As a result, 92.2 g of an ethylene-1-butene copolymer was formed. MFR of the resulting copolymer was 0.10 g/10 minutes. Polymerization conditions are summarized in Table 8 and Polymerization results are summarized in Table 9.

Comparative Example 1

(1) Preparation of Solid Catalyst

A solid catalyst was prepared in the same manner as in (1) Preparation of Solid Catalyst of (Example 1) except that 54 mg of the metallocene compound G was used instead of the metallocene compound A.

(2) Production of Ethylene-1-Butene Copolymer

An ethylene-1-butene copolymer was produced using the solid catalyst obtained in (1) Preparation of Solid Catalyst of the above Comparative Example 1.

An ethylene-1-butene copolymer was produced in the same manner as in Example 3 except that 0.108 g of the solid catalyst obtained in (1) Preparation of Solid Catalyst of Comparative Example 1 was used, 10 ml of 1-butene was introduced at 0.6 MPa, and 6012 ml of hydrogen diluted with nitrogen at a concentration of 5% was introduced at normal pressure.

As a result, 38.0 g of an ethylene-1-butene copolymer was formed. MFR of the resulting copolymer was 1.87 g/10 minutes. Polymerization conditions are summarized in Table 8 and Polymerization results are summarized in Table 9.

Comparative Example 2

(1) Preparation of Solid Catalyst

A solid catalyst was prepared in the same manner as in (1) Preparation of Solid Catalyst of (Example 1) except that 51 mg of the metallocene compound H was used instead of the metallocene compound A.

(2) Production of Ethylene-1-Butene Copolymer

An ethylene-1-butene copolymer was produced using, the solid catalyst obtained in (1) Preparation of Solid Catalyst of the above Comparative Example 2.

An ethylene-1-butene copolymer was produced in the same manner as in Example 1 except that 0.200 g of the solid catalyst obtained in (1) Preparation of Solid Catalyst of Comparative Example 2 was used and 65 ml of hydrogen was introduced at normal pressure before ethylene containing 10% by weight of 1-butene was introduced.

As a result, 17.0 g of an ethylene-1-butene copolymer was formed. MFR of the resulting copolymer was 0.54 g/10 minutes. Polymerization conditions are summarized in Table 8 and Polymerization results are summarized in Table 9.

TABLE 8

| | Catalyst | | | | | | Amount of solid catalyst (g) |
|---|---|---|---|---|---|---|---|
| | Component (A) | | Component (B) | | Component (C) | | |
| Example | Metallocene Compound | Amount (mmol) | Compound | Amount (mmol) | Compound | Amount (g) | |
| 3 | A | 0.00178 | MAO | 0.36 | silica | 0.071 | 0.093 |
| 4 | B | 0.00403 | MAO | 0.81 | silica | 0.161 | 0.209 |
| 5 | C | 0.00345 | MAO | 0.69 | silica | 0.0138 | 0.179 |

TABLE 8-continued

| | | | | | | | |
|---|---|---|---|---|---|---|---|
| 6 | D | 0.00119 | MAO | 0.24 | silica | 0.048 | 0.062 |
| 7 | E | 0.00133 | MAO | 0.27 | silica | 0.053 | 0.069 |
| 8 | F | 0.00073 | MAO | 0.15 | silica | 0.029 | 0.038 |
| C1 | G | 0.00208 | MAO | 0.42 | silica | 0.083 | 0.108 |
| C2 | H | 0.00386 | MAO | 0.77 | silica | 0.154 | 0.200 |

| | Polymerization conditions | | | | | |
|---|---|---|---|---|---|---|
| Example | TEA (mmol) | Solvent | Hydrogen H2/C2 (%) | Comonomer | Temperature (° C.) | C2 partial pressure (MPa) | Polymerization Time (minute) |
| 3 | 0.30 | isobutane | 0.642 | C4/10 ml initial charging | 75 | 1.4 | 60 |
| 4 | 0.30 | isobutane | 0.063 | C4/30 ml initial charging | 75 | 1.4 | 60 |
| 5 | 0.30 | isobutane | 0.075 | C4/30 ml initial charging | 75 | 1.4 | 60 |
| 6 | 0.30 | isobutane | 0.062 | C4/70 ml initial charging | 75 | 1.4 | 60 |
| 7 | 0.30 | isobutane | 0.049 | C4/70 ml initial charging | 75 | 1.4 | 60 |
| 8 | 0.30 | isobutane | 0.139 | C4/70 ml initial charging | 75 | 1.4 | 60 |
| C1 | 0.30 | isobutane | 0.633 | C4/10 ml initial charging | 75 | 1.4 | 60 |
| C2 | 0.50 | heptane | 0.252 | C4/C2 = 5.0 mol % | 75 | 1.4 | 60 |

TABLE 9

| | Results | | | | | | | |
|---|---|---|---|---|---|---|---|---|
| | | Activity | MFR | | | | g' | |
| Example | Yield (g) | (g-PE/g-Cat/hr) | (g/10 minutes) | FR | Mw × $10^4$ | Mw/Mn | $g_a$' value | $g_b$' value |
| 3 | 108.0 | 1153 | 0.20 | 23.4 | 10.7 | 3.9 | 0.89 | — (0.59) |
| 4 | 53.3 | 255 | 3.55 | 9.4 | 9.7 | 5.1 | 0.75 | 0.38 |
| 5 | 30.4 | 170 | 2.11 | 9.0 | 9.4 | 4.5 | 0.81 | 0.42 |
| 6 | 40.0 | 645 | 0.12 | 22.0 | 12.5 | 4.1 | 0.82 | 0.52 |
| 7 | 5.6 | 81 | 0.24 | 21.5 | 11.7 | 4.3 | 0.76 | 0.49 |
| 8 | 92.2 | 2459 | 0.10 | 20.8 | 10.4 | 3.4 | 0.85 | 0.63 |
| C1 | 38.0 | 353 | 1.87 | 15.1 | 6.8 | 3.7 | 0.87 | — (0.63) |
| C2 | 17.0 | 85 | 0.54 | 16.5 | 10.4 | 5.1 | 0.86 | — (0.60) |

4. Evaluation

From Table 7, in Examples 1 and 2 where the catalysts containing a metallocene compound according to the present invention were used, the $g_a$' values and $g_b$' values of the resulting ethylene-based polymers were 0.94 or less and 0.67, respectively, and thus it was revealed that ethylene-based polymers having long-chain branches introduced therein were obtained. With regard to the description of the g' values, "-" was described in the case where any reliable $g_b$' value was not obtained. Moreover, in the case where the minimum value of g' was present between log M=5 and log M=6, the minimum value was described in parentheses in the column of $g_b$'.

Furthermore, from Table 9, it was shown that, in Examples 3 to 7 where the catalysts containing a metallocene compound according to the present invention were used, the $g_a$' values of the resulting ethylene-based polymers are 0.76 to 0.89 and thus are equal to or lower than the $g_a$' values of Comparative Examples 1 and 2. The $g_b$' values of the ethylene-based polymers of Examples 3 to 7 were 0.38 to 0.59 and were lower than the $g_b$' values of Comparative Examples 1 and 2, and thus it was revealed that ethylene-based polymers having more long-chain branches introduced therein were obtained as compared with the cases of the metallocene compound having no substituent at the 3-position of cyclopentathiophene (Comparative Example 1) and the metallocene compound having indene instead of cyclopentathiophene (Comparative Example 2). The ethylene-based polymers are ethylene-based polymers having excellent balance between elongation viscosity behavior and melt fluidity and having good molding processability. Furthermore, the $g_a'$ value and $g_b'$ value of the resulting ethylene-based polymer obtained in Example 8 were equal to the values of Comparative Examples 1 and 2, but there is obtained a result that the polymerization activity is very high, and productivity is also satisfactory.

While the invention has been described in detail and with reference to specific embodiments thereof, it will be apparent to one skilled in the art that various changes and modifications can be made therein without departing from the spirit and scope thereof.

The present application is based on Japanese Patent Application No. 2016-042853 filed on Mar. 4, 2016, and the contents are incorporated herein by reference.

The invention claimed is:

1. A metallocene compound represented by the following general formula (3):

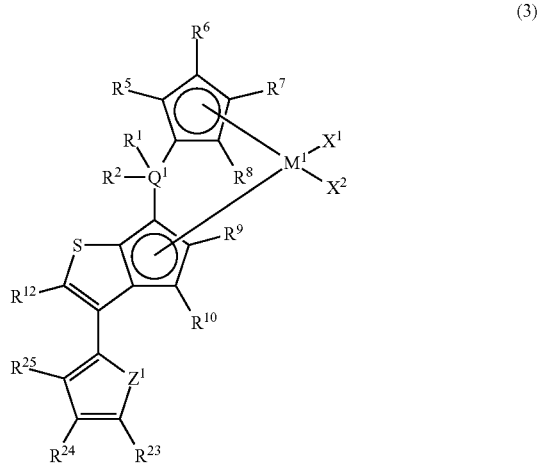

(3)

wherein $M^1$ represents any transition metal of Ti, Zr, and Hf; $X^1$ and $X^2$ represent each independently a hydrogen atom, a halogen, a hydrocarbon group having a carbon number of 1 to 20, an oxygen- or nitrogen-containing hydrocarbon group having a carbon number of 1 to 20, an amino group substituted with a hydrocarbon group having a carbon number of 1 to 20, or an alkoxy group having a carbon number of 1 to 20; $Q^1$ represents a carbon atom, a silicon atom, or a germanium atom; $R^1$ and $R^2$ represent each independently a hydrogen atom or a hydrocarbon group having a carbon number of 1 to 10, and optionally form a ring together with $Q^1$ bonded thereto; $R^5$, $R^6$, $R^7$, $R^8$, $R^9$, $R^{10}$, and $R^{12}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen-containing hydrocarbon group having a carbon number of 1 to 20, or a silyl group substituted with a hydrocarbon group having a carbon number of 1 to 20; $Z^1$ represents an oxygen atom or a sulfur atom; $R^{23}$, $R^{24}$, and $R^{25}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen-containing hydrocarbon group having a carbon number of 1 to 20, or a silyl group substituted with a hydrocarbon group having a carbon number of 1 to 20, and adjacent substituents of $R^{23}$, $R^{24}$, and $R^{25}$ optionally form a ring together with carbon atoms bonded thereto.

2. The metallocene compound according to claim 1, wherein $Q^1$ is a silicon atom in the above general formula (3).

3. The metallocene compound according to claim 1, wherein $R^9$ is a hydrogen atom in the above general formula (3).

4. The metallocene compound according to claim 1, wherein $M^1$ is zirconium or hafnium in the above general formula (3).

5. The metallocene compound according to claim 1, wherein $M^1$ is zirconium in the above general formula (3).

6. A catalyst component for olefin polymerization, comprising the metallocene compound according to claim 1.

7. A catalyst for olefin polymerization, comprising the metallocene compound according to claim 1.

8. A catalyst for olefin polymerization, comprising the following essential components (A), (B) and (C):
Component (A): the metallocene compound according to claim 1,
Component (B): a compound reacting with the metallocene compound of the component (A) to form a cationic metallocene compound, and
Component (C): a fine particle carrier.

9. The catalyst for olefin polymerization according to claim 8, wherein the component (B) is an aluminoxane.

10. The catalyst for olefin polymerization according to claim 8, wherein the component (C) is silica.

11. The catalyst for olefin polymerization according to claim 8, which further comprises the following component (D):
Component (D): an organoaluminum compound.

12. A method for producing an olefin-based polymer, comprising polymerizing an olefin using the catalyst for olefin polymerization according to claim 7.

13. The method for producing an olefin-based polymer according to claim 12, wherein the olefin contains at least ethylene.

14. The method for producing an olefin-based polymer according to claim 13, wherein the olefin-based polymer is an ethylene-based polymer.

* * * * *